United States Patent
Kitsugi et al.

(10) Patent No.: US 10,933,326 B2
(45) Date of Patent: Mar. 2, 2021

(54) GAME DEVICE, PROGRAM, AND GAME SYSTEM

(71) Applicant: BANDAI CO., LTD., Tokyo (JP)

(72) Inventors: Kaori Kitsugi, Tokyo (JP); Ayaka Tabata, Tokyo (JP); Satoshi Endo, Tokyo (JP); Yuri Okamoto, Tokyo (JP)

(73) Assignee: Bandai Co., Ltd., Tokyo (JP)

( * ) Notice: Subject to any disclaimer, the term of this patent is extended or adjusted under 35 U.S.C. 154(b) by 0 days.

(21) Appl. No.: 16/460,951

(22) Filed: Jul. 2, 2019

(65) Prior Publication Data
US 2020/0016491 A1    Jan. 16, 2020

(30) Foreign Application Priority Data

Jul. 11, 2018 (JP) .............................. JP2018-131907

(51) Int. Cl.
*A63F 13/58* (2014.01)
*A63F 13/31* (2014.01)
(Continued)

(52) U.S. Cl.
CPC .............. *A63F 13/58* (2014.09); *A63F 13/23* (2014.09); *A63F 13/31* (2014.09); *A63F 13/44* (2014.09);
(Continued)

(58) Field of Classification Search
None
See application file for complete search history.

(56) References Cited

U.S. PATENT DOCUMENTS

| | | | |
|---|---|---|---|
| 7,878,905 B2 * | 2/2011 | Weston | A63F 13/06 463/39 |
| 2009/0180425 A1 * | 7/2009 | Watanabe | H04W 84/18 370/328 |

(Continued)

FOREIGN PATENT DOCUMENTS

| | | |
|---|---|---|
| JP | 11110514 A | 4/1999 |
| JP | 2006102398 A | 4/2006 |

(Continued)

OTHER PUBLICATIONS

Wonder Life Special Bandai Official Tamagotchi BOOK Tamagotchi Mix Perfect Osawa Book, Shogakukan Co., Ltd. Satoru Matsui, Aug. 31, 2016, First Edition, 16-20, 24-26, 98-110 pages.

(Continued)

*Primary Examiner* — Ronald Laneau
(74) *Attorney, Agent, or Firm* — Alston & Bird LLP

(57) ABSTRACT

There is provided a game device for providing a play experience of a first game in which a first-type game element appears, the game device including a performing unit, an operation unit, a communication unit, and a control unit. The performing unit performs a process concerning the first game. The operation unit accepts an input operation for an operation target game element that is the first-type game element appearing in the first game. The communication unit is configured so as to be capable of transmitting and receiving information concerning the operation target game element between the game device and a same-type game device and between the game device and a first communication terminal capable of providing a play experience of a second game using the first-type game element. The control unit controls the communication unit.

27 Claims, 12 Drawing Sheets

(51) Int. Cl.
*A63F 13/44* (2014.01)
*A63F 13/23* (2014.01)
*A63F 13/5375* (2014.01)

(52) U.S. Cl.
CPC .. *A63F 13/5375* (2014.09); *A63F 2300/1025* (2013.01); *A63F 2300/638* (2013.01); *A63F 2300/65* (2013.01)

(56) References Cited

U.S. PATENT DOCUMENTS

2016/0129349 A1* 5/2016 Zhao .................. A63F 13/537
463/31
2016/0166921 A1* 6/2016 Zhang ................. A63F 13/75
463/31
2018/0353860 A1* 12/2018 Nakamura ............. A63F 13/87

FOREIGN PATENT DOCUMENTS

| JP | 2014046024 A | 3/2014 |
| JP | 2017189476 A | 10/2017 |
| JP | 2018015140 A | 2/2018 |
| JP | 2018042901 A | 3/2018 |

OTHER PUBLICATIONS

JP Application No. 2018-131907, Office Action dated May 29, 2019.

* cited by examiner

GAME DEVICE, PROGRAM, AND GAME SYSTEM

CROSS-REFERENCE TO RELATED APPLICATIONS

This patent application claims priority to Japanese Patent Application No. 2018-131907 filed in the Japan Patent Office on Jul. 11, 2018, the entire contents of which are incorporated herein by reference.

BACKGROUND

Field of the Invention

The present invention relates to a game device, a program, and a game system and specifically relates to a game device that provides a play experience of an electronic game in which a character is raised.

Description of Related Art

A game device is available that provides a game (raising game) having a raising element in which a character is grown in accordance with input operations by a user. Japanese Unexamined Patent Application Publication No. 2017-189476 discloses a technique in which a game device that is a small toy body providing a raising game is allowed to have a communication function and to communicate with a game device of the same type, thereby increasing the amusement of the raising game.

In the game device described in Japanese Unexamined Patent Application Publication No. 2017-189476, short-range wireless communication is employed as communication between game devices, and the game devices need to be physically present within a short range, which is a limitation. Further, there is a possibility that a highly amusing play experience is unable to be provided unless a user, such as a friend or an acquaintance, who owns a game device of the same type is present nearby.

BRIEF SUMMARY

An object of the present invention is to provide a game device, a program, and a game system that easily implement provision of a highly amusing play experience.

A game device according to an aspect of the present invention is a game device for providing a play experience of a first game in which a first-type game element appears, the game device including a performing unit, an operation unit, a communication unit, and a control unit. The performing unit performs a process concerning the first game. The operation unit accepts an input operation for an operation target game element that is the first-type game element appearing in the first game. The communication unit is configured so as to be capable of transmitting and receiving information concerning the operation target game element between the game device and a same-type game device and between the game device and a first communication terminal capable of providing a play experience of a second game using the first-type game element. The control unit controls the communication unit.

With the above-described configuration according to an aspect of the present invention, it is possible to easily implement provision of a highly amusing play experience.

DETAILED DESCRIPTION

First Embodiment

Hereinafter, exemplary embodiments of the present invention will be described in detail with reference to the drawings. Note that, in one embodiment described below, a description will be given of an example where the present invention is applied to a game device capable of providing, to a user, a play experience of a raising game, which is a first game according to the present invention, in which one character (target character), which is a target to be raised (operation target), is caused to appear, the game device being an example of a game device according to the present invention. However, the present invention is applicable to any device that is configured so as to be capable of providing a play experience of not only the raising game but also a game that involves communication with another device as an amusing element. Note that, in this embodiment, it is assumed that a game element that appears in the game is a character, the game element being a first-type game element according to the present invention, and a description is given; however, embodiments of the present invention are not limited by the concept that the first-type game element is a character.

Configuration of Game System

Figure 1:
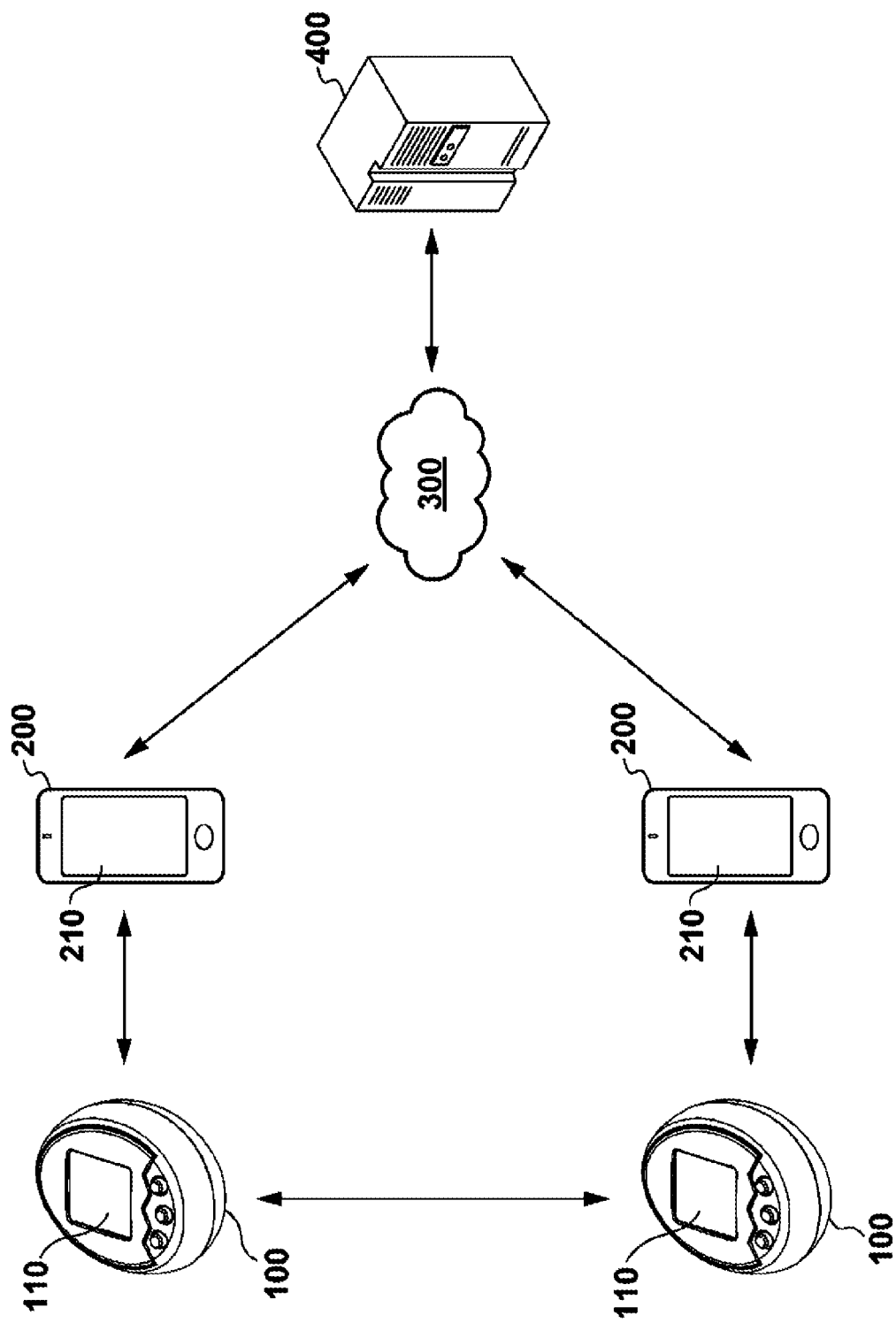
FIG. 1 is a diagram illustrating a configuration of a game system according to an embodiment of the present invention.

Now, a system configuration of a game system according to the embodiment of the present invention will be described with reference to FIG. 1. As illustrated in FIG. 1, in the game system, a game device 100 is configured so as to be capable of communicating with another game device 100 and a smartphone 200, which is a first communication terminal according to the present invention, and the smartphone 200 is connected not only to the game device 100 but also to a management server 400 via a network 300 so as to be capable of exchanging information with another smartphone 200 (transmitting and receiving information concerning each smartphone 200).

In this embodiment, for simplification, it is assumed that communication is performed between game devices 100 and that the devices are the same products that are configured so as to be capable of providing a play experience of a game concerning the same game content, and a description is given; however, embodiments of the present invention are not limited to this. Two game devices that communicate with each other may be game devices that have a relationship between an old-model product and a later product providing a play experience of a game concerning pieces of game content that are compatible with each other and employing a common communication specification for transmitting and receiving information concerning at least some of their functions.

Further, in this embodiment, it is assumed that the first communication terminal is the smartphone 200, and a description is given; however, the first communication terminal need not be limited to the smartphone 200 and may be a device that is configured so as to be capable of providing a play experience of an interaction game, which is a second game according to the present invention. Although the details will be described below, the interaction game is a game in which a game play using a character that is configured so as to be allowed to appear in the raising game is possible, and is a game, with another smartphone 200 similarly executing the interaction game, capable of providing various amusing elements including interaction between users.

The network 300 may be a public communication network, such as the Internet, a local area network, etc. that implements information communication between devices. In this embodiment, communication between smartphones 200 is performed via the network 300 and the management server 400, and therefore, the communication range between the smartphones 200 can be made longer than a communication range within which the game devices 100 can communicate with each other and a communication range within which the game device 100 and the smartphone 200 can communicate with each other. That is, with the game system according to this embodiment, it is possible that a user who uses the game device 100 to play the raising game is not only provided with an amusing element of the raising game through communication with another game device 100 that is present within a predetermined distance range but also provided with an amusing element of the interaction game by causing the game device 100 and the smartphone 200 that can be connected to the network 300 to communicate with each other without a requirement of being present within the predetermined distance range.

Note that, in the following description, among constituent elements that implement similar functions in the game device 100, the smartphone 200, and the management server 400, a constituent element that is included in the smartphone 200 is given a name including the prefix "terminal" and a constituent element that is included in the management server 400 is given a name including the prefix "management" so as to be distinguishable from one another.

Configuration of Game Device 100

Figure 2:
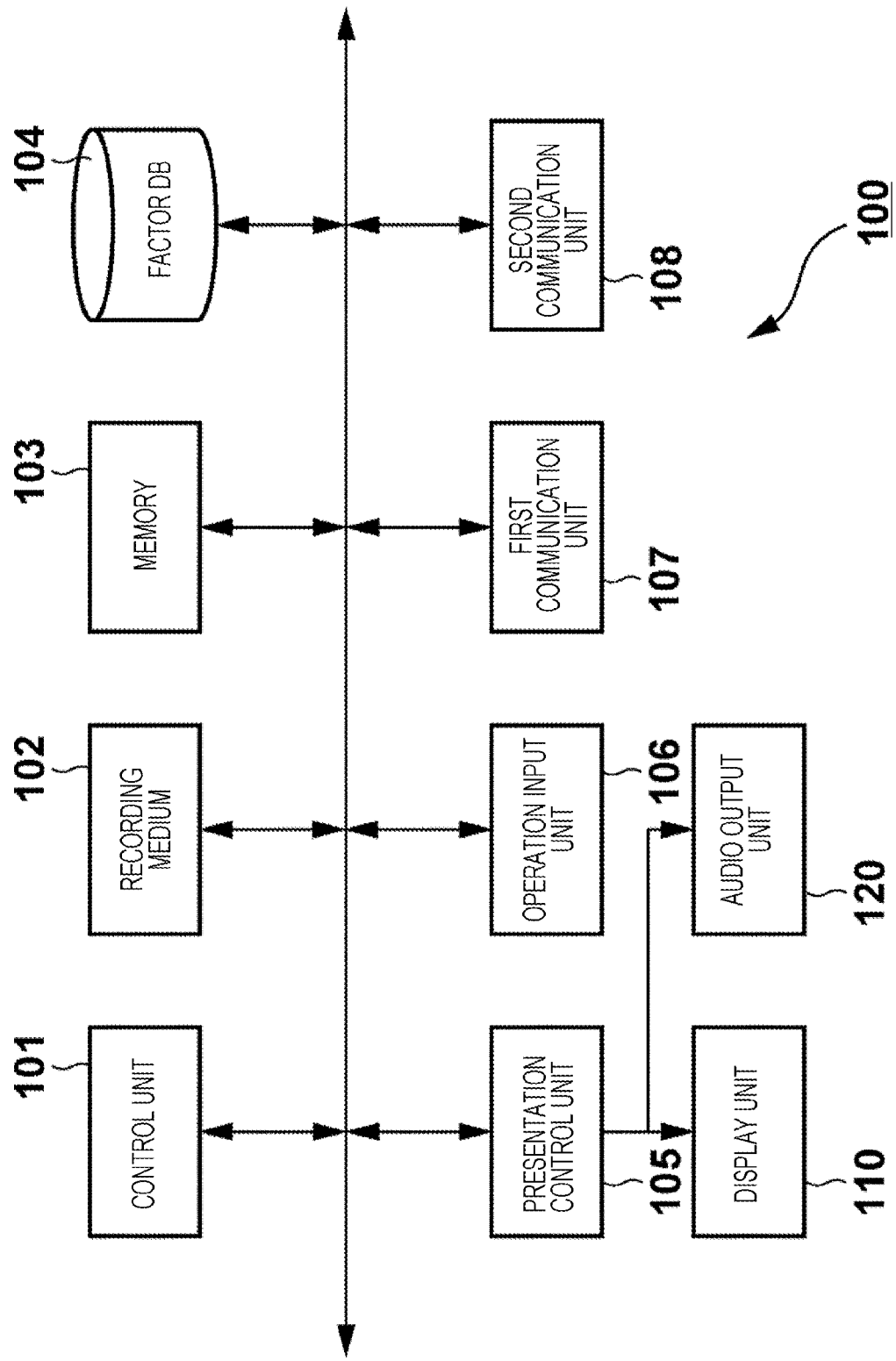
FIG. 2 is a block diagram illustrating a functional configuration of a game device according to the embodiment of the present invention.

First, a functional configuration of the game device 100 will be described with reference to the block diagram in FIG. 2.

A control unit 101 is, for example, a central processing unit (CPU) and controls operations of the blocks of the game device 100. Specifically, the control unit 101 reads an operation program, for the blocks, recorded to, for example, a recording medium 102, loads the operation program to a memory 103, and executes the operation program to thereby control operations of the blocks.

The recording medium 102 is, for example, a recording device, such as a nonvolatile memory or a hard disk drive (HDD), capable of retaining data in a substantially permanent manner. To the recording medium 102, parameters, etc. necessary for operations of the blocks, various graphical user interfaces (GUIs) and background images used in the raising game of this embodiment, an action determination program, and other information are recorded in addition to the operation program for the blocks of the game device 100. The memory 103 is, for example, a recording device, such as a volatile memory, used to temporarily store data. The memory 103 is used not only as a loading area for the operation program for the blocks but also as a storage area for temporarily storing data, etc. output in the operations of the blocks.

A factor DB 104 is a database for managing various types of information including graphics data concerning various parts used to form the external appearances of various characters including the target character in the raising game that provides a play experience in the game device 100 of this embodiment. In the raising game of this embodiment, the external appearance of a character that appears in the game is determined in accordance with the specifics of plays by the user, succession from parent characters, grandparent characters, etc., and factors that are determined at random so as to make individual differences in characters raised by respective users happen as an amusing element. For example, the color, the shape of the head, the eyes, the mouth, the trunk, and the body shape of a character are determined in accordance with the above-described factors, and information about the factors is managed in the factor DB 104.

A presentation control unit 105 is responsible for controlling presentation, to the user, of various types of information in the game device 100. It is assumed that the game device 100 of this embodiment includes a display unit 110 that displays images (game screens, menu screens, etc.) and an audio output unit 120 that outputs sounds as means for presenting various types of information to the user, and a description is given; however, the means for presenting information is not limited to these, and vibration, illumination, information transmission, etc. may be used as a substitute or an addition, as a matter of course.

The presentation control unit 105 includes, for example, a drawing device, such as a drawing chip, and performs a predetermined drawing process when a game screen to be displayed on the display unit 110 is generated. Specifically, the presentation control unit 105 generates a game screen that corresponds to the progress state of the game and refreshes display on the display unit 110 with a predetermined frequency during a period in which the game device 100 is not in a sleep state to thereby present various types of information concerning the raising game. In the raising game that provides a play experience in the game device 100 of this embodiment, a game screen on which the target character is arranged is basically presented so as to allow the user to know the state of the target character. Therefore, the presentation control unit 105 reads from the factor DB 104 and loads to the memory 103 graphics data of corresponding parts on the basis of specified information about the external appearance of the target character, and uses the data to draw the target character. Further, the presentation control unit 105 controls drawing so as to arrange an appropriate background or item as needed or display a GUI on the game screen in accordance with the progress state of the game.

This embodiment assumes a form in which the game device 100 is a toy body that can be easily carried by the user, and therefore, it is assumed that the display unit 110 is a display device, such as a liquid crystal display (LCD), that is built in the game device 100 and is formed in an integrated manner, and a description is given; however, embodiments of the present invention are not limited to this. That is, the display unit 110 may be a display device that is externally connected to the game device 100 so as to be detachable and re-attachable, as a matter of course.

The presentation control unit 105 includes, for example, a circuit, such as a sound chip, that outputs an audio signal, and performs a predetermined process when generating sounds to be output from the audio output unit 120. Specifically, the presentation control unit 105 determines a piece of audio data, among pieces of audio data recorded in advance to the recording medium 102, to be output in accordance with, for example, the progress state of the game, converts the piece of audio data to an electrical audio signal (performs D/A conversion), and outputs the audio signal to the audio output unit 120 to thereby perform audio presentation concerning the raising game. The audio output unit 120 may be a predetermined speaker, etc. and outputs an acoustic wave based on the input audio signal. In this embodiment, it is assumed that the audio output unit 120 is built in the game device 100 similarly to the display unit 110, and a description is given; however, the audio output unit 120 may be externally connected to the game device 100 so as to be detachable and re-attachable.

An operation input unit 106 is a user interface, such as an operation button, of the game device 100. When detecting an input operation performed by the user, the operation input unit 106 transmits a control signal corresponding to the operation to the control unit 101.

A first communication unit 107 and a second communication unit 108 are communication interfaces of the game device 100 for transmitting and receiving information. In this embodiment, the game device 100 is provided with two types of communication methods both of which are short-range wireless communication methods, and uses these different communication methods depending on the purpose, more specifically, the amount of information to be transmitted through communication, the length of the period during which a connection established state needs to be maintained, etc. Therefore, the first communication unit 107 and the second communication unit 108 are configured so as to be capable of communicating with other devices using the different communication methods to enable transmission and reception of information.

In this embodiment, the first communication unit 107 is configured so as to be capable of transmitting and receiving information using a communication method that is used in communication between the game devices 100. Taking into consideration use of the game device 100, which can be a toy body, also by a child, the necessity of complicated setting concerning communication is eliminated. Further, from the viewpoint of letting the user clearly know that communication with a desired communication counterpart is ongoing, the first communication unit 107 may be configured so as to be capable of transmitting and receiving information using, for example, an infrared communication method (Infrared Data Association (IrDA) method).

On the other hand, the second communication unit 108 is configured so as to be capable of transmitting and receiving information using a communication method that is used in communication between the game device 100 and the smartphone 200. The interaction game that provides a play experience in the smartphone 200 of this embodiment is configured so as to allow use of the target character in the raising game of the game device 100, and assumes that most of the input operations are performed on the smartphone 200; however, an input operation on the game device 100 is required as necessary. Therefore, it is desirable that the communication connection between the game device 100 and the smartphone 200 be maintained for a predetermined period and, unlike the infrared communication method, it is desirable not to limit the spatial positional relationship between the smartphone 200 and the game device 100. Accordingly, the second communication unit 108 may be configured so as to be capable of transmitting and receiving information using, for example, a short-range wireless communication method (Bluetooth Low Energy (BLE) method) so that a large amount of information can be transmitted in a shorter time than that in the case of using the infrared communication method while power consumption is reduced.

Note that, in this embodiment, it is assumed that the communication methods of the first communication unit 107 and the second communication unit 108 are the IrDA method and the BLE method respectively, and a description is given; however, embodiments of the present invention are not limited to this. These communication methods may be any methods as long as the methods are different short-range wireless communication methods, as a matter of course.

Configuration of Smartphone 200

Figure 3:
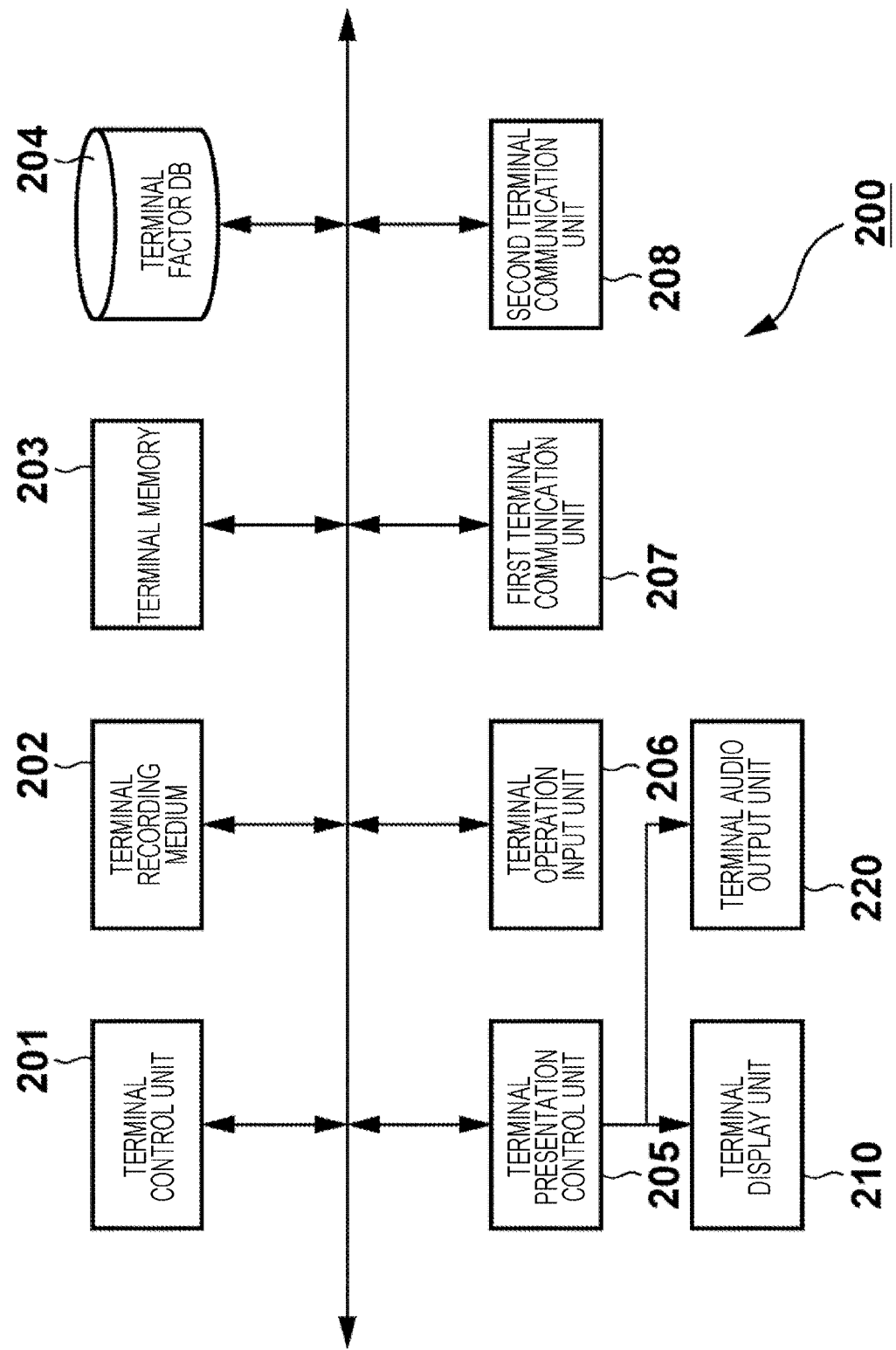
FIG. 3 is a block diagram illustrating a functional configuration of a smartphone according to the embodiment of the present invention.

Next, a functional configuration of the smartphone 200 will be described with reference to the block diagram in FIG. 3.

A terminal control unit 201 is, for example, a CPU and controls operations of the blocks of the smartphone 200. Specifically, the terminal control unit 201 reads an operation program for the blocks and an application program concerning the interaction game recorded to, for example, a terminal recording medium 202, loads the programs to a terminal memory 203, and executes the programs to thereby control operations of the blocks.

The terminal recording medium 202 is, for example, a recording device, such as a nonvolatile memory or an HDD, capable of retaining data in a substantially permanent manner. To the terminal recording medium 202, parameters, etc. necessary for operations of the blocks, the application program concerning the interaction game of this embodiment, various GUIs and background images used in the interaction game of this embodiment, and other information are recorded in addition to the operation program for the blocks of the smartphone 200. The terminal memory 203 is, for example, a recording device, such as a volatile memory, used to temporarily store data. The terminal memory 203 is used not only as a loading area for the operation program for the blocks but also as a storage area for temporarily storing data, etc. output in the operations of the blocks.

A terminal factor DB 204 is a database for managing various types of information including graphics data concerning various parts used to form the external appearances of various characters concerning the interaction game that provides a play experience in the smartphone 200 of this embodiment. The types of parts for which information is managed in the terminal factor DB 204 are basically the same as those managed in the factor DB 104 of the game device 100. It is assumed that a character having an external appearance the same as that of the target character of the raising game can be reproduced also in the interaction game on the basis of information from the game device 100, and a description is given.

Note that, in the form in which the game device 100 is configured as a toy body as described above, the size and capabilities of the display unit 110 are determined by taking into consideration the portability and manufacturing costs of the toy body, and therefore, the resolution (number of pixels) of the display unit 110 can naturally become low. Specifically, when the target character is displayed together with a background image and necessary information in the raising game, the external appearance of the target character needs to be displayed in part of the display area of the display unit 110, and therefore, graphics data of each part needs to be configured so that the external appearance can be expressed by a smaller number of pixels. On the other hand, a communication terminal, such as the smartphone 200, provides functions of photograph browsing, email, Web browsing, etc., and therefore, a terminal display unit 210 of the smartphone 200 described below is configured so as to have a resolution higher than that of the display unit 110. Accordingly, the external appearance of a character concerning the raising game can be displayed with a higher resolution, and graphics data concerning the same part may be configured with different display resolutions for the game device 100 and the smartphone 200.

A terminal presentation control unit 205 is responsible for controlling presentation, to the user, of various types of information in the smartphone 200. It is assumed that the smartphone 200 of this embodiment includes the terminal display unit 210 that displays images (game screens, menu screens, etc.) and a terminal audio output unit 220 that outputs sounds as means for presenting various types of information to the user, and a description is given; however, the means for presenting information is not limited to these, and vibration, illumination, information transmission, etc. may be used as a substitute or an addition, as a matter of course.

The terminal presentation control unit 205 includes, for example, a drawing device, such as a graphics processing unit (GPU), and performs a predetermined drawing process when various screens to be displayed on the terminal display unit 210 are generated. Specifically, the terminal presentation control unit 205 generates a game screen that corresponds to the progress state of the interaction game and refreshes display on the terminal display unit 210 with a predetermined frequency while the application program for the interaction game is being executed to thereby present various types of information concerning the interaction game. In the interaction game that provides a play experience in the smartphone 200 of this embodiment, a game screen is presented on which a raising target character of the raising game concerning another user and a non-player character (NPC) are arranged in addition to the target character of the raising game in the game device 100 (owned by the user) having a communication connection, as in the case of the game device 100. Therefore, the terminal presentation control unit 205 reads from the terminal factor DB 204 and loads to the terminal memory 203 graphics data of corresponding parts on the basis of specified information about the external appearances of the respective characters, and uses the data to draw the group of characters. Further, the terminal presentation control unit 205 controls drawing so as to arrange an appropriate background or item as needed or display a GUI on the game screen in accordance with the progress state of the game.

This embodiment assumes a form in which the smartphone 200 is an information communication terminal that can be easily carried similarly to the game device 100, and therefore, it is assumed that the terminal display unit 210 is a display device, such as an LCD, that is built in the smartphone 200 and is formed in an integrated manner, and a description is given; however, embodiments of the present invention are not limited to this. That is, the terminal display unit 210 may be a display device that is externally connected to the smartphone 200 so as to be detachable and re-attachable, as a matter of course.

The terminal presentation control unit 205 includes, for example, a circuit, such as a sound chip, that outputs an audio signal, and performs a predetermined process when generating sounds to be output from the terminal audio output unit 220. Specifically, the terminal presentation control unit 205 determines a piece of audio data, among pieces of audio data recorded in advance to the terminal recording medium 202, to be output in accordance with, for example, the progress state of the game, converts the piece of audio data to an electrical audio signal (performs D/A conversion), and outputs the audio signal to the terminal audio output unit 220 to thereby perform audio presentation concerning the interaction game. The terminal audio output unit 220 may be a predetermined speaker, etc. and outputs an acoustic wave based on the input audio signal. In this embodiment, it is assumed that the terminal audio output unit 220 is built in the smartphone 200 similarly to the terminal display unit 210, and a description is given; however, the terminal audio output unit 220 may be externally connected to the smartphone 200 so as to be detachable and re-attachable.

A terminal operation input unit 206 is a user interface, such as an operation button or a touch panel for detecting a touch operation performed on a screen of the terminal display unit 210, of the smartphone 200. When detecting an input operation performed by the user, the terminal operation input unit 206 transmits a control signal corresponding to the operation to the terminal control unit 201.

A first terminal communication unit 207 and a second terminal communication unit 208 are communication interfaces of the smartphone 200 for transmitting and receiving information. In this embodiment, the smartphone 200 is configured so as to be capable of performing communication using two types of communication methods so as to implement direct communication with the game device 100 and indirect communication with the management server 400 and another smartphone 200 via the network 300. Therefore, the first terminal communication unit 207 and the second terminal communication unit 208 are configured so as to be capable of communicating with other devices using the different communication methods to enable transmission and reception of information.

In this embodiment, the first terminal communication unit 207 is configured so as to be capable of transmitting and receiving information using the communication method that is used in communication between the game device 100 and the smartphone 200. As described above, communication between the game device 100 and the smartphone 200 in which a game play of the interaction game that provides a play experience in the smartphone 200 is ongoing may be configured so as to enable transmission and reception of information using, for example, a short-range wireless communication method (BLE method) so that a large amount of information can be transmitted in a shorter time than that in the case of using the infrared communication method while power consumption during a period in which the communication connection is maintained is reduced.

On the other hand, the second terminal communication unit 208 is configured so as to be capable of transmitting and receiving information using a communication method that is used in communication via the network 300 and the management server 400 so that information can be exchanged between the smartphone 200 and another smartphone 200. As described above, in the interaction game that provides a play experience in the smartphone 200, communication via the network 300 and the management server 400 is implemented so as to enable provision of an amusing element using characters concerning the raising game without the game devices 100 being present within the predetermined distance range and so as to enable provision of an amusing element concerning communication among a large number of characters in addition to an amusing element concerning one-to-one communication between characters.

Management Server 400

Figure 4:
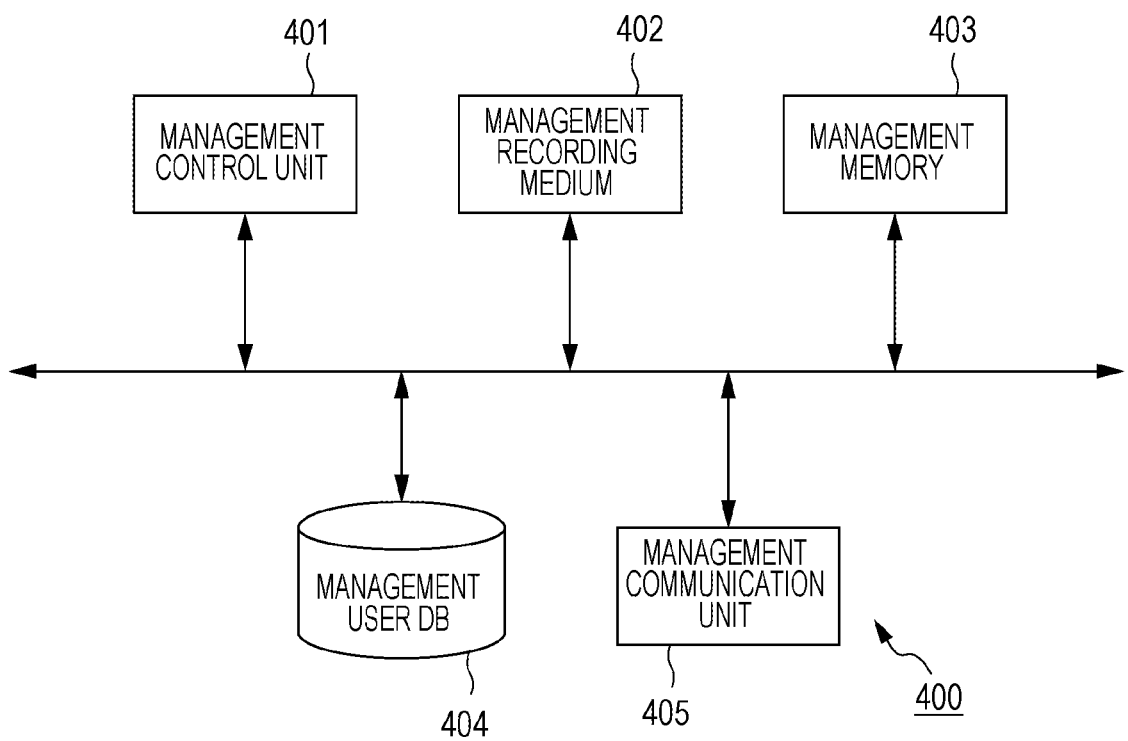
FIG. 4 is a block diagram illustrating a functional configuration of a management server according to the embodiment of the present invention.

Next, a functional configuration of the management server 400 will be described with reference to the block diagram in FIG. 4.

A management control unit 401 is, for example, a CPU and controls operations of the blocks of the management server 400. Specifically, the management control unit 401 reads an operation program, for the blocks, recorded to, for example, a management recording medium 402, loads the operation program to a management memory 403, and executes the operation program to thereby control operations of the blocks.

The management recording medium 402 is, for example, a recording device, such as a nonvolatile memory or an HDD, capable of retaining data in a substantially permanent manner. To the management recording medium 402, parameters, etc. necessary for operations of the blocks and other information are recorded in addition to the operation program for the blocks of the management server 400. The management memory 403 is, for example, a recording device, such as a volatile memory, used to temporarily store data. The management memory 403 is used not only as a loading area for the operation program for the blocks but also as a storage area for temporarily storing data, etc. output in the operations of the blocks.

Figure 12A:
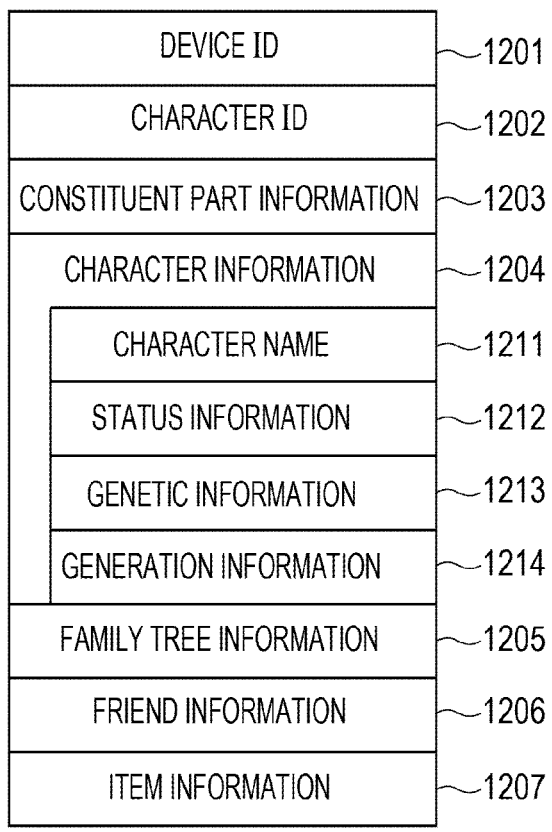
FIGS. 12A and 12B are diagrams illustrating data structures of various types of information used in the game system according to the embodiment of the present invention.

A management user DB 404 is a database for managing information about each character associated with a corresponding user (user information) for the interaction game that provides a play experience in the smartphone 200 in the game system of this embodiment. In other words, the information managed in the management user DB 404 includes information indicating each target character of a corresponding game device 100 with which a game play of the interaction game becomes possible when the game device 100 is connected to the smartphone 200. In this embodiment, in order to manage information about each target character that is currently a raising target in a corresponding game device 100, the user information may include, for example, a character ID 1202, constituent part information 1203, character information 1204, family tree information 1205, friend information 1206, and item information 1207, which are associated with a device ID 1201 for identifying the game device 100, as illustrated in FIG. 12A. The character ID 1202 is used to identify the target character. The constituent part information 1203 is used to identify a group of parts that constitute the external appearance of the target character. The character information 1204 includes various types of information concerning the target character. The family tree information 1205 indicates characters that are related to the birth of the target character as described below. The friend information 1206 indicates a user (game device) with which a friend relationship is established in the interaction game. The item information 1207 includes information about items (game elements of a type different from characters) given to the target character in the interaction game. Here, the character information 1204 may include, for example, a character name 1211 that is set for one character, status information 1212 that indicates various parameters concerning the game that may vary depending on the raising state, etc. and fixed parameters, such as the gender of the character, genetic information 1213 that includes information inherited from the characters involved in the birth of the character, and generation information 1214 that indicates the generation number of the character in the family tree.

A management communication unit 405 is a communication interface of the management server 400 for transmitting and receiving information. In this embodiment, the management server 400 is configured so as to be capable of communicating with one or more smartphones 200 in which the application program concerning the interaction game is running, via the network 300 and, unlike the game device 100 and the smartphone 200, may be provided with only one type of communication method as a usable communication method for transmitting and receiving information.

Game Content

Game content that is provided in each device of the game system of this embodiment thus configured will be described.

As described above, the raising game that provides a play experience in the game device 100 and the interaction game that provides a play experience in the smartphone 200 are configured so as to enable a game play by the user using the same target character, and the pieces of game content of these games are related to each other. In this embodiment, it is assumed that the interaction game is a game that is configured so as to extend some of the amusing elements of the raising game that can be experienced only with the game device 100, and a description is given; however, embodiments of the present invention are not limited to this. That is, the interaction game and the raising game may be games that can provide amusing elements, at least some of which are common to the games, or may be games that provide completely different amusing elements.

Raising Element

The raising game that provides a play experience in the game device 100 mainly provides an amusing element concerning raising of the target character.

For one target character, a plurality of raising stages between which a transition occurs as the time passes are specified, and the form (external appearance and behavior) of the target character changes in accordance with the specifics of the progress of the game in each stage. In the start stage of the raising game, the target character is in an egg state, and the user can raise the target character from when the target character hatches out from the egg until when the target character becomes an adult after the childhood.

Figure 12B:
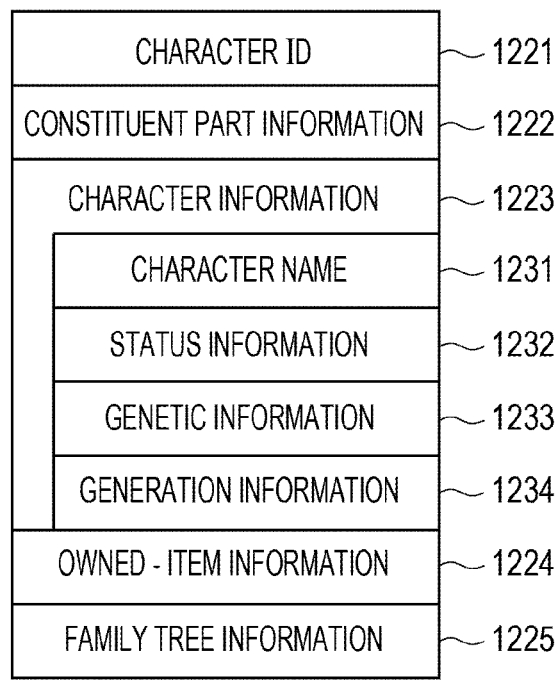

For the raising game that is executed in the game device 100, for example, raising information as illustrated in FIG. 12B is managed for the target character and may be used in progress control or drawing control for the game. As illustrated in FIG. 12B, the raising information may include constituent part information 1222, character information 1223, owned-item information 1224, and family tree information 1225, which are associated with, for example, a character ID 1221 for identifying the target character in the game device 100. The constituent part information 1222 is used to identify a group of parts that constitute the external appearance of the target character in the current raising stage. The character information 1223 is information concerning the target character. The owned-item information 1224 indicates items that are obtained in a play of the raising game. Here, the character information 1223 may be configured similarly to the character information 1204 that is managed in a similar manner in the management user DB 404 described with reference to FIG. 12A.

Although no events occur in an egg state, in a raising process after hatching, events for which a user operation (caring) needs to be performed for the target character are provided. Such care-requiring events are controlled so as to occur at random. When a care-requiring event occurs, a notification indicating the occurrence of the event or a notification indicating the necessity of a user operation is given via, for example, the audio output unit 120. For each of the care-requiring events, a specific input operation is specified as an appropriate input operation. When the user performs, before the elapse of a predetermined time since the occurrence of an event, a corresponding input operation, an achievement condition concerning the event can be satisfied.

In a case where the achievement condition concerning the care-requiring event is satisfied, at least some of the statuses associated with the target character change in such a manner that, for example, the parameter of an affection degree that is specified for the character increases. On the other hand, in a case where no input operation is performed in response to the notification and the achievement condition for the care-requiring event is not satisfied, basically a negative status change opposite to the change occurring when the achievement condition is satisfied occurs in such a manner that, for example, the parameter of the affection degree of the target character decreases.

Depending on the type of care-requiring event or the number of times the achievement condition is not satisfied (the total number of times or the number of times the achievement condition is not satisfied successively), the target character transitions from a fine state to a sick state as a result of the achievement condition being not satisfied. In a case where the target character enters a sick state, the raising game is controlled so as to allow only an input operation concerning treatment of the target character. After the start of treatment, execution of various functions of providing amusing elements of the raising game, such as predetermined playing, is limited until the treatment of the target character is completed, and control is performed so as basically not to accept an input operation by the user.

Figure 5B:
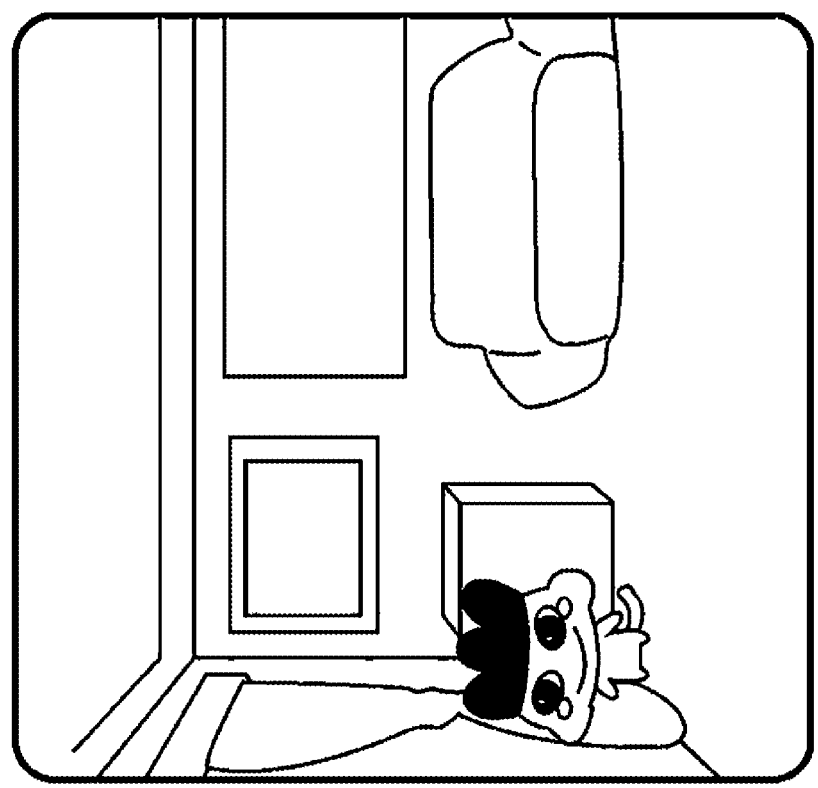
FIGS. 5A and 5B are diagrams for explaining display forms of a target character in the game device according to the embodiment of the present invention.
Figure 5A:
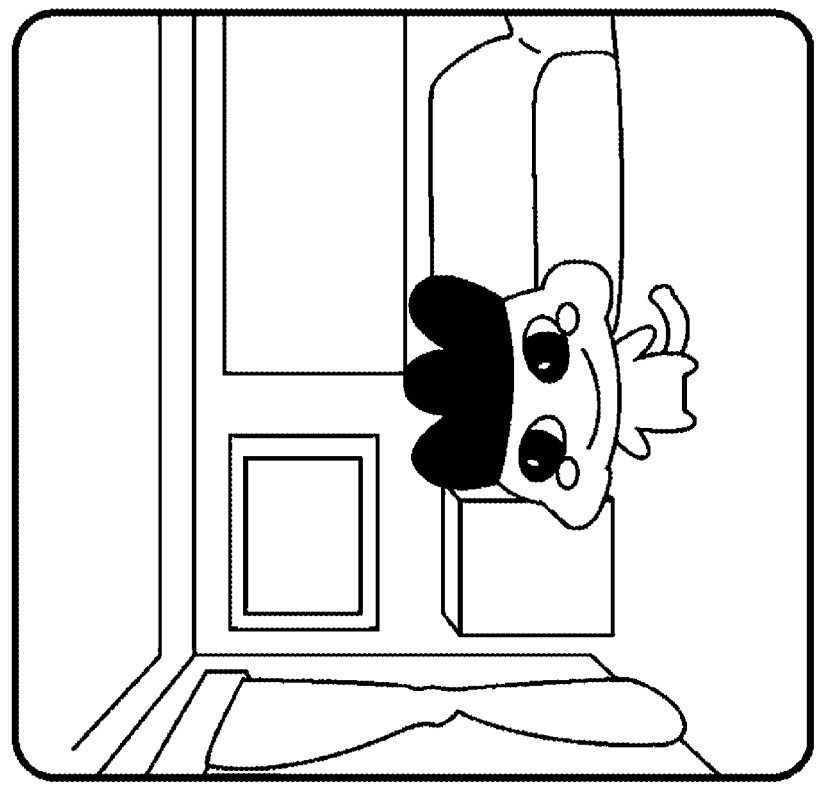

Status information 1232 concerning the target character may include, for example, a rank that is determined in accordance with the affection degree and, in the raising game of this embodiment, the normal display position of the target character on the display unit 110 is controlled so as to differ depending on the rank. The rank needs to include, for example, two types, namely, "affectionate state" and "rebellious state", which are determined in accordance with whether the numerical value of the affection degree exceeds a threshold. In this form, in a case where the character is in the affectionate state, display needs to be controlled so that the target character is displayed in a center area of the display unit 110, as illustrated in FIG. 5A. In a case where the character is in the rebellious state, display needs to be controlled so that the target character is displayed in a peripheral area of the display unit 110, as illustrated in FIG. 5B.

Communication Element

The raising game of this embodiment is configured so as to enable basic game plays concerning raising with a separated single game device 100. The user can raise the target character while moving the target character in a room or to a location configured in the game device 100 and completing various events. On the other hand, the game device 100 is also configured so as to be capable of communicating with another game device 100 and the smartphone 200 as described above, and further amusing elements using communication are provided. More specifically, when the user performs communication with another game device 100 or performs communication with the smartphone 200 to play the interaction game, an amusing element in which the target characters of the raising game in the respective game devices 100 interact with each other can be provided.

Communication Element Between Game Devices

An amusing element that is provided through communication between two game devices 100 may be an element that is configured as an "going-out event" that involves, for example, a performance in which the target character of one of the game devices 100 visits a room of the target character configured in the other game device 100 and in which a plurality of characters participate and interact with one another. For the "going-out event", a plurality of types of actions may be set as an action list, which include an action in which the characters perform predetermined playing, an action in which the characters exchange items, an action in which the characters take an action for marriage between the characters as described below, etc. during the visit.

Here, the performance of visiting corresponds to a state where the target character of the raising game that is executed in the game device 100 on the visiting side is not displayed on the display unit 110 of the game device 100 and is displayed on the display unit 110 of the game device 100 on the visited side (communication counterpart). In other words, in a case where communication between two game devices 100 is performed to cause the "going-out event" to occur, the target character concerning the game device 100 on the visiting side undergoes a performance of sending (moving) the character (performance indicating that the character is caused to appear in another game), is temporarily not displayed on the display unit 110 of the device, and is displayed on the display unit 110 of the game device 100 on the visited side. At this time, on the display unit 110 of the game device 100 on the visited side, the target character concerning the device and the character that visits the device in the "going-out event" are simultaneously displayed, and various types of performances concerning the event are displayed. In a case where the target character is temporarily not displayed, the presentation control unit 105 performs display so as to indicate that the target character is currently out and absent instead of displaying an image of the target character on the display unit 110 of the game device 100. At the time when the "going-out event" ends (at the time when predetermined event-related display in the game device 100 on the visited side ends), a performance in which the target character that is out returns from the game device 100 of the communication counterpart is displayed on the display unit 110 of the game device 100 on the visiting side, and a performance in which the visiting character goes back to the game device 100 that is the home is displayed on the display unit 110 of the game device 100 on the visited side.

Note that the "going-out event" need not be an event that is implemented by a character actually moving between the game devices 100. That is, the control unit 101 of the game device 100 on the visiting side needs to only transmit information necessary for displaying the target character to the game device 100 of the communication counterpart, and thereafter, needs to control the presentation control unit 105 so as not to display the target character on the display unit 110 temporarily in response to, for example, the transmission.

In the game system of this embodiment, infrared communication is employed as communication between the game devices 100; however, signals transmitted by using the infrared communication method have high directivity, and light emission-reception units included in the first communication units 107 of the respective game devices 100 need to face each other. That is, at the timing when information concerning the "going-out event" needs to be transmitted and received, the light emission-reception units of the respective game devices 100 need to face each other. Therefore, the users need to stop the game play as needed and adjust the positional relationship between the two game devices 100 so that information is successfully transmitted and received. Accordingly, the game device 100 of this embodiment performs control so as to minimize the number of times communication needs to be performed for the "going-out event" that requires communication between the game devices 100.

Basically, an event result concerning an action selected from the action list is determined and shared at the time of communication, and the event result that includes a performance of moving (sending and visiting) and a performance of coming back after the moving (returning and going back) is presented without the necessity of establishing a communication connection again.

Specifically, in a case where an action in which a character of another game device 100 makes a visit (is invited) is selected, during a period in which, for example, communication is maintained, the control unit 101 of the game device 100 on the visited side performs computation to determine the result of an event that is caused to occur, on the basis of information received from the game device 100 on the visiting side and on the basis of information about the target character, of the game device 100 on the visited side, managed in the memory 103, and transmits the result of the event and information about the timing when the result is to be displayed in the game device 100 on the visiting side. On the other hand, in a case where an action in which a character visits (is sent to) another game device 100 is selected, during a period in which, for example, communication is maintained, the control unit 101 of the game device 100 on the visiting side configures and transmits information for transmitting the target character (at least part of the raising information, etc.), and thereafter, receives information about the result of an event from the game device 100 on the visited side. Such transmission and reception of information may be performed in accordance with, for example, the sequence chart concerning the "going-out event" illustrated in FIG. 6.

Figure 6:
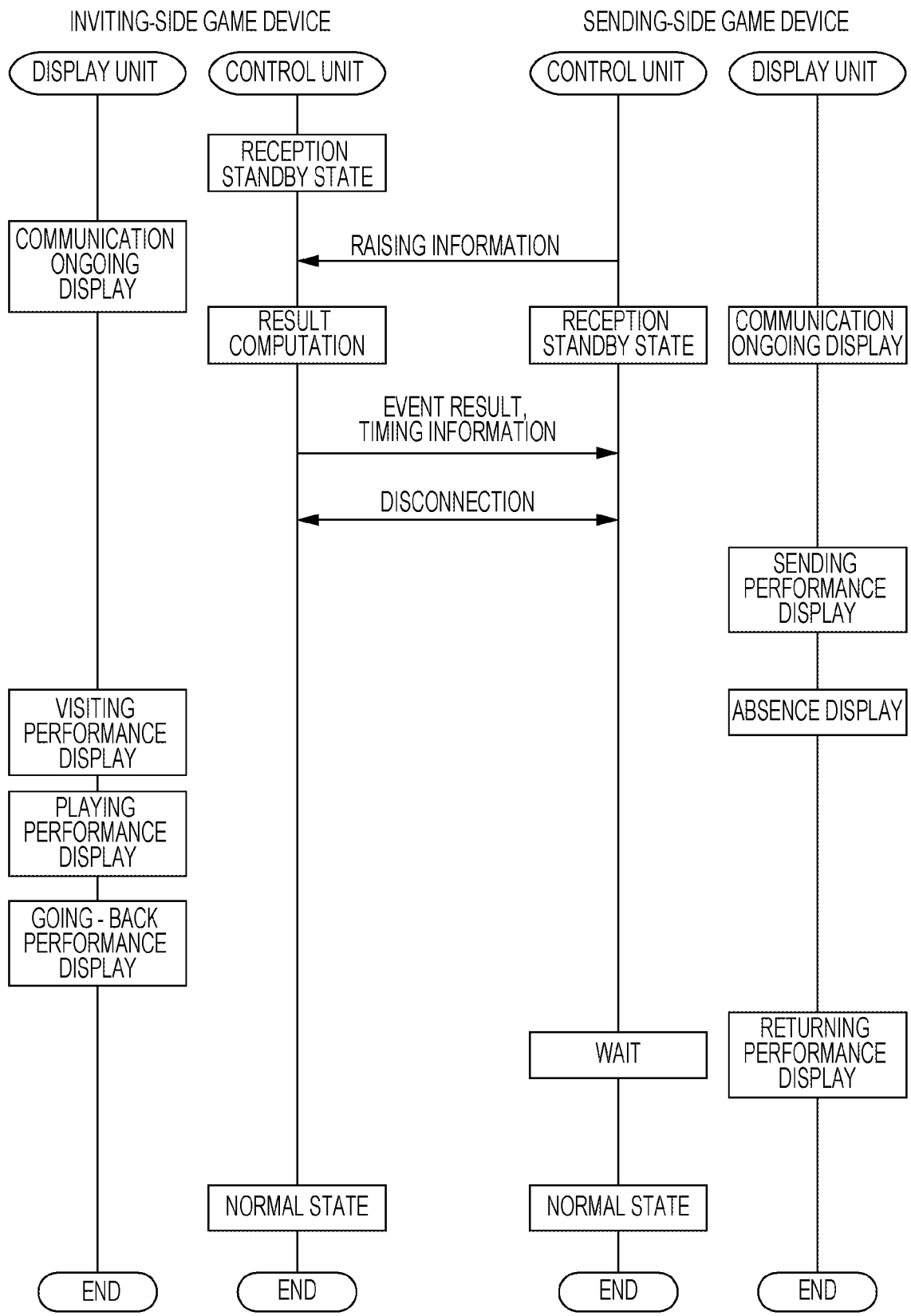
FIG. 6 is a sequence chart illustrating processing concerning an amusing element that is provided by using communication between game devices according to the embodiment of the present invention.

For simplification, the sequence chart in FIG. 6 illustrates a sequence in a case where an action of visiting and performing predetermined playing is selected. It is assumed that the sequence is started in a case where, in the game device 100 on the visiting side (sending-side game device) and the game device 100 on the visited side (inviting-side game device), corresponding actions (sending and inviting) in the action list for the "going-out event" are respectively selected, and where these game devices are in a communication standby state.

As illustrated in FIG. 6, the control unit 101 of the sending-side game device and the control unit 101 of the inviting-side game device start respective processes concerning the "going-out event" after a communication connection has been established between the devices. First, the control unit 101 of the inviting-side game device controls the first communication unit 107 so as to be in a reception standby state and causes the presentation control unit 105 thereof to display an image indicating that communication is ongoing on the display unit 110. On the other hand, the control unit 101 of the sending-side game device transmits raising information to the inviting-side game device via the first communication unit 107 and causes the presentation control unit 105 thereof to display, on the display unit 110, an image indicating that communication is ongoing. When the raising information is successfully transmitted, the control unit 101 of the sending-side game device controls the first communication unit 107 so as to be in a reception standby state.

When receiving the raising information from the sending-side game device, the control unit 101 of the inviting-side game device computes the result of an event corresponding to the action on the basis of the received raising information and raising information about the target character managed in the inviting-side game device. The control unit 101 of the inviting-side game device transmits, to the sending-side game device via the first communication unit 107, information about the event result and information about the timing when the event result is to be presented. When the transmitted information is received by the first communication unit 107 of the sending-side game device, the control units 101 disconnect the communication and start controlling the respective presentation control units 105 so that performances concerning the "going-out event" are displayed on the respective display units 110. Here, the performances concerning the "going-out event" that are displayed may include a performance in which the target character is sent to the inviting-side game device and display indicating that the target character is absent in the sending-side game device and include a performance in which the character visits the inviting-side game device from the sending-side game device in the inviting-side game device.

After disconnection of the communication, the control unit 101 of the inviting-side game device controls the presentation control unit 105 thereof to display, on the display unit 110, a performance concerning predetermined playing in which the character concerning the received raising information and the target character that is being raised appear. After display of the performance, the presentation control unit 105 displays, on the display unit 110, a performance in which the character concerning the received raising information goes back to the sending-side game device. After display of the performance concerning going back of the character, the control unit 101 of the inviting-side game device ends the processing concerning the sequence and causes the device to transition to a normal state (a state in which normal control concerning the raising game is performed).

On the other hand, after disconnection of the communication, in accordance with the received information about the timing when the event result is to be presented, the control unit 101 of the sending-side game device waits until the timing of presentation. Here, the information about the timing when the event result is to be presented may be information indicating, for example, a time from when the communication is disconnected until when display of the performance concerning going back of the character ends in the inviting-side game device, with which content displayed on the display unit 110 is not consistent between the inviting-side game device and the sending-side game device, that is, the same character is not displayed on the display units 110 of both the game devices simultaneously. The control unit 101 of the sending-side game device waits for a period from the communication disconnection to the timing of presentation, and thereafter, controls the presentation control unit 105 to display, on the display unit 110, a performance concerning returning of the target character instead of the display indicating absence. After display of the performance concerning returning of the target character, the control unit 101 of the sending-side game device ends the processing concerning the sequence and causes the device to transition to the normal state. At this time, in a case where an item, etc. is obtained in the predetermined playing, etc. performed in the inviting-side game device, the target character is displayed on the display unit 110 of the sending-side game device together with the item.

Accordingly, during the period in which the target character concerning the sending-side game device is displayed on the display unit 110 of the inviting-side game device, the target character is not displayed on the display unit 110 of the sending-side game device, and a play experience concerning an amusing element associated with communication between the game devices 100 can be provided in a suitable manner. Note that, in the example illustrated as the sequence chart in FIG. 6, it is assumed that transmission and reception of information concerning the "going-out event" is completed with a transient communication connection, and the description is given. For example, for an event (a proposal reception event, etc. described below) that requires user input on the sending-side game device, a form may be employed in which a communication connection is requested again, and the result of the event is computed and transmitted when information about the user input is received.

Communication Element Between Game Device and Smartphone

On the other hand, an amusing element that is provided through communication between the game device 100 and the smartphone 200 is provided in the interaction game.

As described above, in the game system of this embodiment, the game device 100 and the smartphone 200 communicate with each other to thereby enable a play, on the smartphone 200, of the interaction game in which the target character that is being raised using the game device 100 is an operation target. More specifically, in the interaction game of this embodiment, an open-space scene (game scene) in which characters can virtually gather together is provided so that users owning the game devices 100 can interact with each other even in an environment in which the users are unable to bring their game devices 100. In this open-space scene, an NPC, such as an event character, and characters that are similarly sent to the smartphone 200 currently are arranged and displayed.

Note that, as the communication between the game devices 100 described above, one-to-one communication is assumed, and characters that are displayed on the respective display units 110 when the communication function is used are basically two target characters that are being raised in the respective game devices 100 that communicate with each other. On the other hand, as the terminal display unit 210 of the smartphone 200, a display unit having a number of pixels larger than that of the display unit 110 is employed, as described above. Therefore, the number of characters that can be displayed in the open-space scene in the interaction game is larger than the number of characters that are displayed on either of the game devices 100 when the game devices 100 communicate with each other.

The interaction game may be configured so that user information is managed in association with the device ID 1201 of the game device 100 as described above and so that an interaction function between users, such as a social networking service (SNS), is provided. For example, when a predetermined operation is performed via a character concerning another user displayed in the open-space scene, a friend relationship can be established with the other user. Information about the other user with which the friend relationship is established needs to be stored as the friend information 1206 in the user information, and control needs to be performed so that the character concerning the other user is preferentially displayed in the open-space scene or is preferentially arranged at a conspicuous position in the open-space scene. However, a character that is displayed in the open-space scene is not limited to the character concerning a user who is registered as a friend, and a character concerning a user who causes the game device 100 and the smartphone 200 to communicate with each other and is playing the interaction game on the smartphone 200 in the same time period as described below may be displayed.

The interaction game of this embodiment further includes an element of extending a function concerning the action for marriage between characters among the actions included in the "going-out event" provided by the game device 100, and the function can be used when the target character is sent from the game scene of the raising game to the open-space scene of the interaction game. When the target character is returned to the game scene of the raising game after the use of the function, the game play of the raising game can be resumed. Accordingly, when the user causes the game device 100 and the smartphone 200 to communicate with each other, the user can reflect, to the raising game, an update of the status of the target character and release of a predetermined condition corresponding to the specifics of the play of the interaction game.

Here, marriage between characters, which is one of the amusing elements provided through communication in the game system of this embodiment, will be described.

In the raising game according to this embodiment, the target character is configured so as to be allowed to establish a marital relationship with another character of the opposite sex when reaching a predetermined raising stage. After establishment of a marital relationship, the target character can bring about the birth of a new character (child character), which is the next generation, with the character of the opposite sex. At this time, a "parent-child relationship" is established between the target character (or the opposite-sex character) and the child character, and the target character becomes a parent character for the child character.

The opposite-sex character with which a marital relationship can be established can be selected from among a character (NPC character) that appears in the game in accordance with the specifics of the play of the raising game, a character that appears through communication with the game device 100 of another user via the first communication unit 107 and that is in the same raising stage and is being raised in the game device 100 of the other user, and a character that is in the same raising stage and with which contact can be made via the interaction game in the smartphone 200. More specifically, in a form in which only the raising game is played, a marital relationship can be established with an NPC character or a character that is being raised in another game device 100 with which communication is ongoing, and in a form in which the interaction game is additionally used, a marital relationship can be established also with a character that is an operation target of the interaction game in the smartphone 200 with which communication can be performed via the network 300 and the management server 400.

The interaction game of this embodiment is configured so as to enable communication among a large number of characters as described above, and the user can have various interactions including marriage with a character that is raised by a user who is using the smartphone 200 connected to the management server 400 and playing the interaction game in the same time period, that is, a character with which the interaction game is played while the game device 100 and the smartphone 200 are caused to communicate with each other in the same time period. Elements that are provided in the interaction game may include, for example, an element in which information about a character that is raised by another user can be referred to and an element in which a friend relationship is established with a user who raises a character to thereby provide another function, such as a user communication function.

To establish a marital relationship between the target character and another opposite-sex character in the interaction game, a method in which a condition is imposed that an operation for making a proposal of marriage to the other opposite-sex character that appears in the interaction game is performed on the smartphone 200 and that the user who is raising the other opposite-sex character accepts the proposal and a method in which a condition is imposed that a proposal is similarly made to the target character from the other opposite-sex character and that the user accepts the proposal are provided. The same applies to the raising game, and a marital relationship between characters requires mutual agreement between the users who raise the respective characters. That is, the game is configured so as not to establish a marital relationship unless a proposal is accepted, and therefore, establishment of an unintended marital relationship, etc. in the interaction game is avoided.

When a marital relationship is established, at least two child characters in an egg state are born between the characters, and the child characters are provided to the respective parent characters (at least one egg is provided to each parent character). Therefore, in the interaction game, after establishment of a marital relationship and provision of eggs, the user performs an operation of returning the target character to the raising game to allow the target character to appear in the raising game in a state where the target character holds the egg, which is the child character (a state where the target character is accompanied by the child character). After returning of the target character to the raising game, the child character in an egg state hatches out from the egg at a predetermined timing and grows together with the target character, which is the parent character. Note that, in a case where a marital relationship is not established, even if the operation of returning the target character to the raising game is performed, the target character appears in the raising game in a state where the target character is not accompanied by any characters.

The raising game of this embodiment is configured so that, in a case where the target character is accompanied by a child character, the child character can be a new raising target of the raising game after a transition of the target character to a predetermined growing stage, after the occurrence of a predetermined game event concerning the target character (the target character reaches its end of life, retires from active life, etc.), or in accordance with an input operation by the user. When the raising game is thus configured, the user can cause the raising target of the raising game to be succeeded and can continue the game play. In the succession, a generation change is implemented in which the previous target character is put in a state where an input operation concerning raising is not allowed any more (the raising game concerning the target character ends), and the child character becomes a new target character and is put in a state where an input operation concerning raising is allowed (the raising game in which the child character is a new target character starts). When such a generation change is enabled, it is possible to make the user maintain their interest in the raising game. In other words, when succession of the target character occurs, the raising information retained in the memory 103 is changed from the raising information about the parent character to the raising information about the child character. At this time, generation information 1234 included in the character information 1223 is changed to indicate a value representing the next generation obtained by incrementing a value assigned to the parent character by 1. The value representing the generation may be set to 1 (first generation) in a case where, for example, the raising game starts with an egg in a state where a parent character is not present (in a case where the raising game is first played in an initialized state of the game device 100), and thereafter, may be changed to a corresponding numerical value representing the second generation, the third generation, . . . , the N-th generation (where N is a natural number) each time a child character is set as the target character. In this embodiment, it is assumed that the generation information 1234 is newly set in the raising information when succession of the target character occurs, and a description is given; however, generation information about the child character may be associated at the time point when a marital relationship between the parent characters is established.

The external appearance of the child character is determined by succeeding at least some of the constituent parts that constitute the two characters that have become parent characters and a group of characters that involve the birth of each of the two characters (a group of characters that are connected to the child character and are in older generations than that of the child character in the family tree information). That is, when an external-appearance factor of a character which the user is familiar with, such as the target character before succession, is inherited, a performance element is provided in which affection for the child character increases. Such an inheritance performance concerning succession of an external-appearance factor is implemented by storing information about constituent parts inherited from the above-described group of characters in each raising stage as genetic information 1233 in the raising information, and referring to the genetic information 1233 and the specifics of the play of the raising game and determining the constituent part information 1222 in each raising stage.

In other words, in order for the user to play the raising game using the target character having a desired external appearance, the user needs to establish a marital relationship with a character having constituent parts that represent the desired external appearance and bring about the birth of a child character. From this viewpoint, a larger number of options become available to the user or the possibility of obtaining a desired child character increases in a case where the user searches for a character having the corresponding constituent parts in the open-space scene of the interaction game and makes a proposal than in a case where the user searches for a user who is raising a character having the corresponding constituent parts, causes the game devices 100 to communicate with each other, and performs a proposal operation.

Note that, in order to make the user maintain their interest in the raising game for a long time, a configuration may be employed as an amusing element concerning marriage in which, in a case where the numerical value indicated by the generation information about the target character is equal to or larger than a predetermined threshold, a plurality of child characters are provided at random. That is, as a bonus for a user who plays the raising game using the game device 100 for a long time, control may be performed so as to allow raising of, for example, twin characters. In a case where succession occurs and twin characters are set as raising targets, the user can similarly play the raising game; however, the raising game is configured so as to allow selection of either of the characters to be sent in a case of sending through communication. The raising game thus configured not only contributes to an increase in the amusement of the raising game due to an increased number of target characters but also makes a desired character more easily appear by selecting a character having a desired external appearance from among the target twin characters and establishing a marital relationship.

In a form in which the game device 100 is a toy body as described above and a child uses the game device 100 as the user, the child might not own the smartphone 200, as a matter of course. In such a form, a case is assumed where the smartphone 200 owned by the child's parent, relative, etc. is used to play the interaction game. That is, a case is assumed where the child independently plays the raising game and, for example, the child and their parent play the interaction game by using the smartphone 200 owned by the child's parent (the parent operates the smartphone 200 and the child views a presented game screen of the interaction game in the vicinity). When such a play style is assumed, there is a possibility that the parent operating the smartphone 200 performs an accidental operation and, for example, a proposal not desired by the child user is accepted. In other words, there is a possibility that the user who is raising the target character is not given the right to make a decision on whether to accept a proposal. In such a case, the user's interest in the raising game and the interaction game may decrease.

Therefore, the game system of this embodiment is configured so that, when a proposal is made to the target character in the interaction game, a decision on whether to accept or reject the proposal requires an input operation on the game device 100 that is being connected to the smartphone 200 (the game device 100 in which the target character is being raised). That is, in a case where a proposal is received from another smartphone 200 in the interaction game, the terminal control unit 201 transmits information about the proposal to the game device 100 via the first terminal communication unit 207, and the game device 100 displays a screen for selecting acceptance or rejection of the proposal on the display unit 110 in response to reception of the information and waits for an input operation by the user. When an input operation is performed on the screen, the control unit 101 transmits information about the input operation to the smartphone 200 via the second communication unit 108, and the terminal control unit 201 returns a response to the proposal to the smartphone 200 concerning the character having made the proposal via the network 300 and the management server 400 in accordance with the information about the input operation. Consequently, control is performed so as to display the result on the terminal display units 210 of both the smartphones 200 in a similar manner.

With the configuration as described above, even in the use form as described above, the child can secure a final right to make a decision on establishment of a marital relationship, which urges the user, who is a child, to actively play the interaction game and contributes to maintaining of their interest in the games. It is difficult to secure a sufficient recording capacity for the recording medium 102 because of the manufacturing costs and the size of the casing of the game device 100, which is a toy body, and therefore, even in a use form other than the above-described use form, it is not suitable to make the specification of communication concerning acceptance of a proposal differ between communication between the game devices 100 and communication between the game device 100 and the smartphone 200 (because this leads to an increase in a data amount for an application program concerning the raising game). Therefore, in any form, an operation for accepting or rejecting a proposal needs to be performed as an input operation on the game device 100 that communicates with the smartphone 200.

Further, the interaction game of this embodiment may include a function of increasing the amusement of the raising game in addition to the function concerning an action for marriage between characters. The interaction game may be configured so that, for example, an event in which a character can participate to perform predetermined playing is provided and, when the character participates in the event, the character can obtain an item, which is one form of a second-type game element according to the present invention. In this case, after the item has been acquired in the interaction game, the user performs an operation of returning the target character to the raising game so that the user can cause the target character to appear in a state where the character carries the item in the raising game. At this time, the presentation control unit 105 needs to perform control so as to present the target character on the display unit 110 together with the item so that the item acquired in the interaction game is clearly indicated. Note that the obtained item becomes usable in the raising game when the control unit 101 updates the owned-item information 1224 in the raising information.

As described above, the interaction game is configured so that the user can experience various amusing elements, and therefore, unlike in a case of communication between the game devices 100 in which an action to be taken through communication is determined in advance, it is not possible to compute the result of an event concerning an action when a communication connection is established. That is, in a case of causing the game device 100 and the smartphone 200 to communicate with each other, only a fact that a game play using the target character is possible in the interaction game is established, and an action that is taken after establishment of a communication connection is dynamically determined in accordance with the play state of the interaction game. That is, while the interaction game using the target character is being played, exchange of information between the game device 100 and the smartphone 200 may occur in accordance with not only an operation performed by the user (an operation of returning the target character to the raising game) but also an operation performed by a user using another smartphone 200 (an operation concerning a proposal to the target character).

Therefore, if a communication specification is employed that requires establishment of a communication connection between the game device 100 and the smartphone 200 as needed, the user may feel troublesome. Therefore, in the game system of this embodiment, a communication connection between the game device 100 and the smartphone 200 is established via the second communication unit 108 as described above and is maintained, for example, until the elapse of a predetermined timeout time without any communication or unless the game device 100 and the smartphone 200 are separated from each other so that communication becomes not possible. In other words, while the interaction game is being played, the game device 100 and the smartphone 200 is basically kept in a communication connection state until an operation of returning the target character in the interaction game is performed.

Hereinafter, transmission and reception of information concerning amusing elements that are provided by using communication between the game device 100 and the smartphone 200 will be described with reference to the sequence charts in FIG. 7 and FIG. 8.

Figure 7:
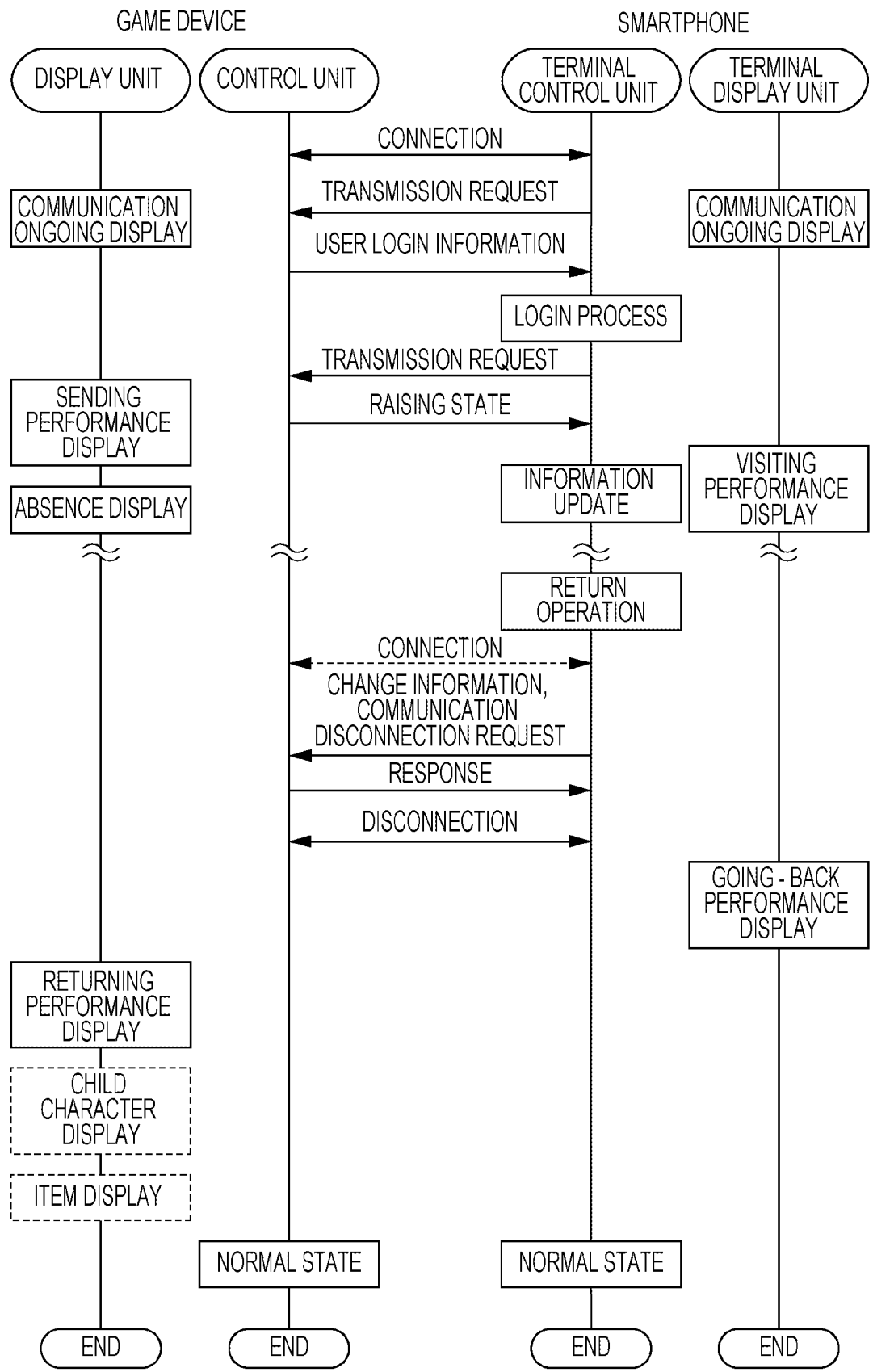
FIG. 7 is a sequence chart illustrating processing concerning an amusing element that is provided by using communication between the game device and the smartphone according to the embodiment of the present invention.

The sequence chart in FIG. 7 illustrates a sequence concerning the start and end of the interaction game using the target character, and the sequence is started in a case where an operation for starting the interaction game is performed on each of the game device 100 and the smartphone 200 and where these devices are in a communication standby state.

As illustrated in FIG. 7, when a communication connection is established between the game device 100 and the smartphone 200, the control unit 101 of the game device 100 and the terminal control unit 201 of the smartphone 200 each start processing concerning execution of the interaction game. First, the terminal control unit 201 transmits a transmission request for transmitting user login information concerning the start of the interaction game to the game device 100 via the first terminal communication unit 207. On the other hand, when receiving the transmission request, the control unit 101 causes the presentation control unit 105 to display, on the display unit 110, an image indicating that communication is ongoing and returns a device ID to the smartphone 200 via the second communication unit 108 as the user login information.

When receiving the device ID, the terminal control unit 201 performs a login process concerning the use of a service of the interaction game for the management server 400 via the second terminal communication unit 208. When the login is completed, the terminal control unit 201 transmits a transmission request for transmitting information indicating the current raising state of the target character to the game device 100. On the other hand, when receiving the transmission request, the control unit 101 configures information corresponding to the user information on the basis of the raising information and returns the information to the smartphone 200 via the second communication unit 108 as the information indicating the current raising state of the target character. Further, the control unit 101 controls the presentation control unit 105 so that a performance of sending the target character to the smartphone 200 and display indicating that the target character is absent are displayed on the display unit 110 as in the "going-out event".

When receiving the information indicating the current raising state of the target character, the terminal control unit 201 transmits the information to the management server 400 via the second terminal communication unit 208 to cause the user information concerning the user who is using the service to be updated. The terminal control unit 201 controls the terminal presentation control unit 205 so that a performance in which the target character visits the smartphone 200 from the game device 100 is displayed on the terminal display unit 210. The terminal control unit 201 starts various types of processing concerning the game play of the interaction game using the target character. Accordingly, the target character is controlled so as to be displayed only on the terminal display unit 210 of the smartphone 200 and so as not to be displayed on the display unit 110 of the game device 100 in a case where the interaction game is played as in the case where communication between the game devices 100 is performed.

Accordingly, the user can play the interaction game using the target character on the smartphone 200. In a case where the processing concerning the game play of the interaction game is started, and thereafter, the interaction game is ended, that is, an operation of returning the target character to the raising game is performed, the terminal control unit 201 performs the subsequent processing concerning the sequence in the sequence chart in FIG. 7. Note that, if the communication connection is disconnected at this time, control is performed to establish a communication connection again.

The terminal control unit 201 transmits information about changes occurring in the target character in the interaction game (the birth of a child character (egg), acquisition of an item, changes in the status, etc.) to the game device 100 via the second terminal communication unit 208 together with a communication disconnection request. When receiving the communication disconnection request, the control unit 101 returns a predetermined response to the smartphone 200 via the second communication unit 108. Thereafter, the control unit 101 and the terminal control unit 201 respectively control the second communication unit 108 and the first terminal communication unit 207 to perform processing concerning communication disconnection.

After the communication disconnection, the terminal control unit 201 controls the terminal presentation control unit 205 so as to display, on the terminal display unit 210, a performance in which the target character goes back to the game device 100. After display of the performance concerning going back of the character, the terminal control unit 201 ends the processing concerning the sequence and controls the state of the interaction game so as not to allow a play of the interaction game using the target character.

After the communication disconnection, the control unit 101 controls the presentation control unit 105 so as to display a performance concerning returning of the target character on the display unit 110 instead of the display indicating the absence. In a case where information indicating that a child character was born is associated with the target character, the performance to be displayed may include a performance in which the target character is displayed together with the child character. In a case where information indicating that an item has been acquired is associated with the target character, the performance to be displayed may include a performance in which the target character is displayed together with the item. After display of the performance concerning returning of the target character, the control unit 101 ends the processing concerning the sequence and causes the device to transition to the normal state.

Accordingly, it is possible to display various performances concerning the start and end of the interaction game that is provided in a state where the game device 100 and the smartphone 200 are caused to communicate with each other, and to provide a play experience similar to amusing elements provided through communication between the game devices 100.

Figure 8:
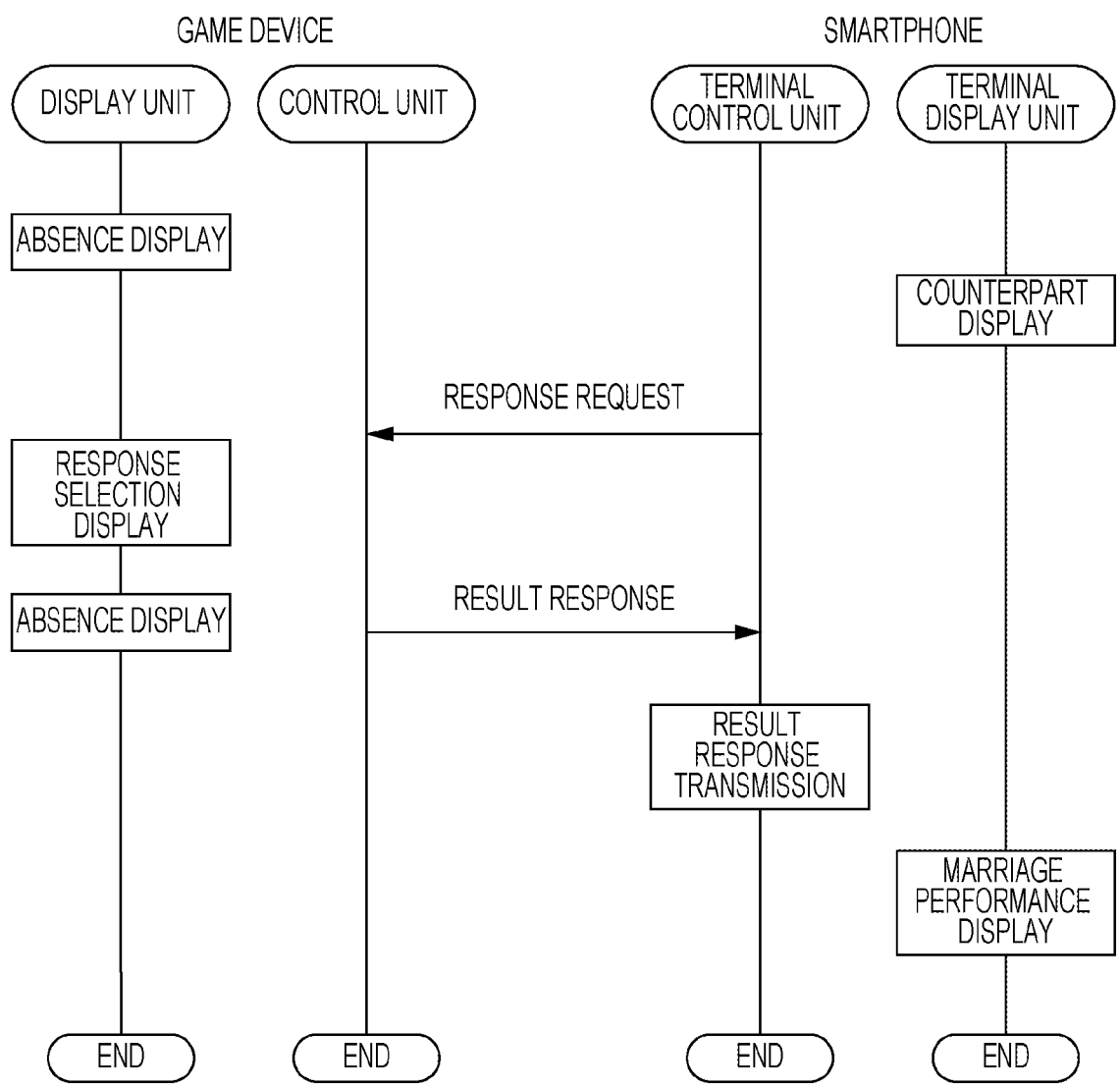
FIG. 8 is a sequence chart illustrating other processing concerning an amusing element that is provided by using communication between the game device and the smartphone according to the embodiment of the present invention.

The sequence chart in FIG. 8 illustrates a sequence concerning a case where a proposal has been made to the target character while a play experience of the interaction game using the target character is being provided. The sequence is started in a case where the terminal control unit 201 receives from the management server 400 a notification indicating that a proposal has been made to the target character while the interaction game is being played. The sequence is executed under the assumption that a communication connection between the game device 100 and the smartphone 200 is established and display indicating that the target character is absent is displayed on the display unit 110. If the communication connection is disconnected, control is performed so as to establish a communication connection again and similar display control is performed, as a matter of course.

When receiving the notification indicating that a proposal has been made to the target character, the terminal control unit 201 first controls the terminal presentation control unit 205 so as to display, on the terminal display unit 210, information about a counterpart that has made the proposal received together with the notification. Here, it is assumed that the information about the counterpart that has made the proposal is displayed on the smartphone 200, and a description is given; however, embodiments of the present invention are not limited to this. The information about the counterpart may be displayed on the game device 100 on which an operation for acceptance or rejection is performed or may be displayed on both the game device 100 and the smartphone 200.

The terminal control unit 201 transmits a response request for requesting a response to the proposal to the game device 100 via the first terminal communication unit 207. When receiving the response request, the control unit 101 controls the presentation control unit 105 so as to display a screen including a GUI for selecting whether to accept or reject the proposal on the display unit 110. When a selection operation is performed on the screen, the control unit 101 transmits information about the selection result (result response) to the smartphone 200 via the second communication unit 108. After transmission of the information about the selection result, the control unit 101 controls the presentation control unit 105 so as to perform display indicating that the target character is absent on the display unit 110 again.

The terminal control unit 201 transmits the information about the result response to the received proposal to the management server 400 via the second terminal communication unit 208. Note that the information about the result response is transmitted also to the smartphone 200 that is associated with the character having made the proposal, for display of the result, which means from a wider standpoint that the information about the result response that is transmitted in this sequence is transmitted to the smartphone 200 that is associated with the character having made the proposal and that is connected via the management server 400. The terminal control unit 201 controls the terminal presentation control unit 205 so as to display a performance concerning marriage on the terminal display unit 210 on the basis of the information about the result response.

Accordingly, it is possible to avoid establishment of a marital relationship not intended by the user as described above and to provide a suitable play experience of the game.

Exception of Communication

In order to increase the user's interest in the raising game and to avoid a situation where the game becomes unable to progress, in the raising game of this embodiment, the use of a function using communication (communication function) is allowed on condition that the state of the target character in the raising game corresponds to a state where a game play involving communication is permitted (communication permitted state), which is a first state according to the present invention. In other words, in a case where the state of the target character corresponds to a state where a game play involving communication is not permitted (communication prohibited state), which is a second state according to the present invention, a limitation is imposed so as not to allow the use of the communication function.

The game may fail if a situation is allowed where display is performed in a form in which an input operation can be performed by using the communication function even in a state where it is desirable not to allow an input operation, such as a case where the target character is in a raising stage in which the target character is in an egg state and it is not possible to perform an operation for the character as described above. For example, the target character that does not receive a necessary care and becomes a sick state is in a state where the target character needs to receive treatment, and therefore, is controlled so as to be in a state where the other activities are not allowed. Accordingly, it is not suitable to allow the target character in such a state to be in a state where the target character can perform predetermined playing, etc. by using the communication function.

From the viewpoint of avoiding a situation where the user, who is, for example, a child, can play the raising game without limitation, it is desirable to employ a form in which the raising game is configured so that the target character is in a sleep state during nighttime hours and does not require any more care until the next morning and no operations are accepted. Therefore, it is not suitable either to allow a state where predetermined playing, etc. becomes possible by using the communication function even during a time period in which, for example, the target character is specified to be in a sleep state.

The raising game of this embodiment performs control so as not to allow the use of the communication function in a case where an appropriate state of the target character (a state that is to be presented when a performance concerning predetermined playing or a function concerning communication is displayed) in a case of using the communication function and the current state of the target character in the raising game are diverged from each other. In other words, in a case where the target character is in a state where action control of the target character corresponding to an input operation is allowed, it is determined that the target character is in the communication permitted state, and control is performed so as to allow the use of the communication function. In a case where the target character is in a state where action control of the target character corresponding to an input operation is not allowed, it is determined that the target character is in the communication prohibited state, and control is performed so as not to allow the use of the communication function.

Note that, in the raising game of this embodiment, it is assumed that the built-in clock of the game device 100 is set to the time in the time zone in which the game device 100 is present and that, in a case where the current time is within a predetermined time period during which the target character is to be in a sleep state, control is performed so that the target character is put in a sleep state, and a description is given. However, if the built-in clock is set to the actual time, hours for which the user can play the game may be significantly limited depending on the user's life pattern or active hours. Therefore, the built-in clock of the game device 100 may be configured so that the built-in clock of the game device 100 can be changed and set to a time different from the actual time, and determination as to whether the target character is to be in a sleep state may be performed with reference to the time indicated by the built-in clock that is changed and set. Accordingly, it is possible to put the target character in an active state during the user's active hours.

Communication Control Process

Figure 9:
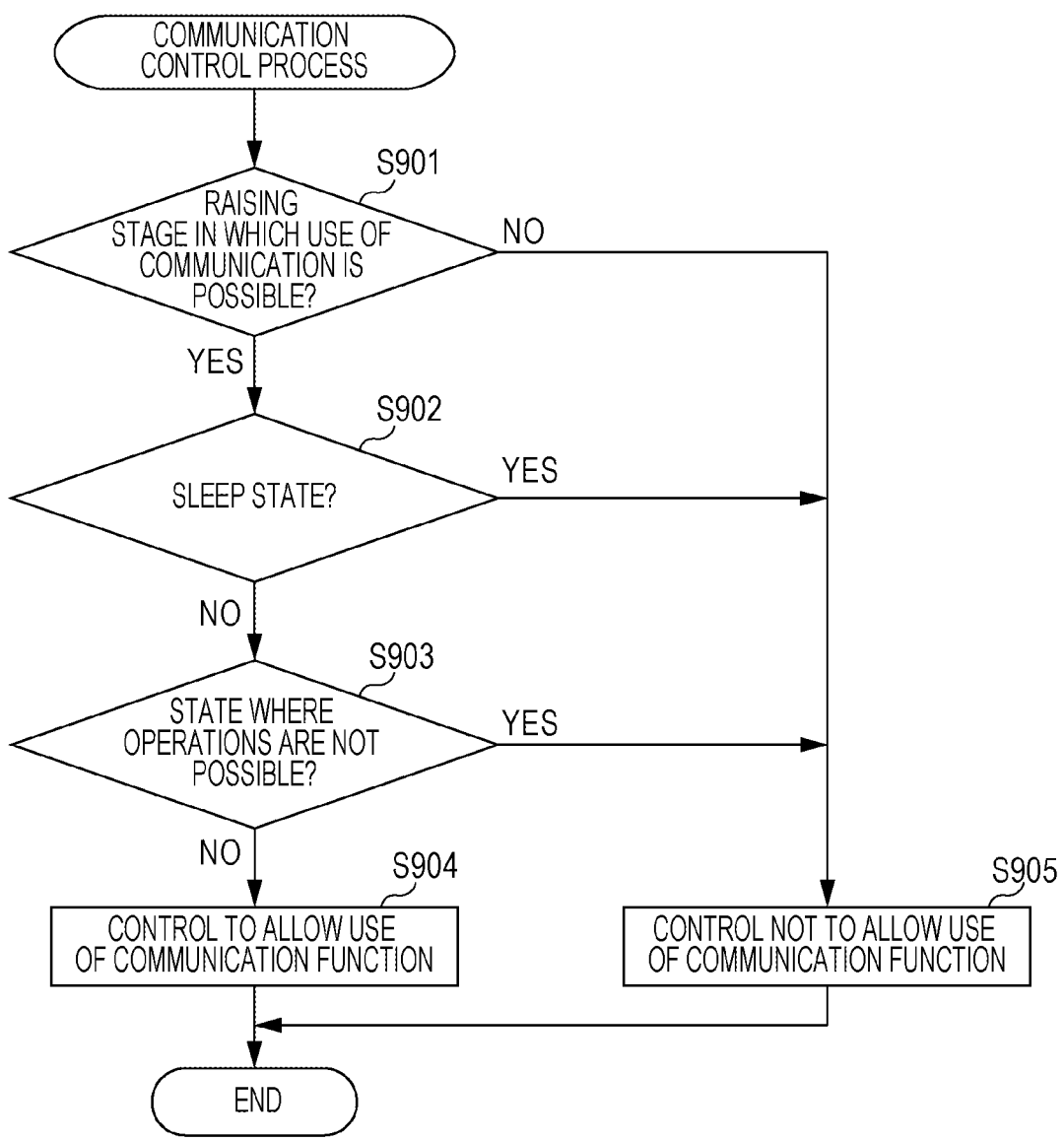
FIG. 9 is a flowchart illustrating a communication control process that is performed in the game device according to the embodiment of the present invention.

A communication control process for controlling processing concerning the use of the communication function in the raising game of this embodiment as described above will be specifically described with reference to the flowchart in FIG. 9. Processing corresponding to the flowchart can be implemented by the control unit 101 reading a corresponding processing program stored in, for example, the recording medium 102, loads the processing program to the memory 103, and executes the processing program. Note that it is assumed that the communication control process is started when, for example, an input operation concerning the use of a function using communication between the game devices 100 or between the game device 100 and the smartphone 200 is detected, and a description is given.

In S901, the control unit 101 determines whether the target character is in a raising stage in which use of the communication function is possible. In a case where the control unit 101 determines that the target character is in a raising stage in which use of the communication function is possible, the processing proceeds to S902. In a case where the control unit 101 determines that the target character is in a raising stage in which use of the communication function is not yet possible, the control unit 101 determines that the target character is in the communication prohibited state, and the processing proceeds to S905.

In S902, the control unit 101 determines whether the target character is in a sleep state. More specifically, the control unit 101 performs determination in S902 on the basis of whether the current time indicated by the built-in clock of the game device 100 is within a time period during which the target character is to be in a sleep state. In a case where the control unit 101 determines that the target character is in a sleep state, the control unit 101 determines that the target character is in the communication prohibited state, and the processing proceeds to S905. In a case where the control unit 101 determines that the target character is not in a sleep state, the processing proceeds to S903.

In S903, the control unit 101 determines whether the target character is in a state where operations are not possible. In a case where the control unit 101 determines that the target character is in a state where operations are not possible, the control unit 101 determines that the target character is in the communication prohibited state, and the processing proceeds to S905. In a case where the control unit 101 determines that the target character is not in a state where operations are not possible, the control unit 101 determines that the target character is in the communication permitted state, and the processing proceeds to S904.

In S904, the control unit 101 controls the state of the first communication unit 107 or the second communication unit 108 so as to allow the use of the communication function, and the communication control process ends.

On the other hand, in a case where the control unit 101 determines that the target character is in the communication prohibited state in S901 to S903, the control unit 101 controls the state of the first communication unit 107 or the second communication unit 108 so as not to allow the use of the communication function in S905, and the communication control process ends.

Accordingly, with the game system of this embodiment, it is possible to easily implement provision of a highly amusing play experience.

Second Embodiment

In the first embodiment described above, it is assumed that the game device 100 can provide amusing elements concerning communication when the game device 100 communicates with another game device 100 of the same type that is configured so as to be capable of executing a raising game and when the game device 100 communicates with the smartphone 200 that is configured so as to be capable of executing the interaction game, and the description has been given. However, embodiments of the present invention are not limited to this. A device with which the game device 100 can communicate may be a terminal that does not have the function of executing the games but has a distribution function and that is configured so as to allow installation in a desired place, such as a store front or an exhibition site.

Configuration of Distribution Station

Figure 10:
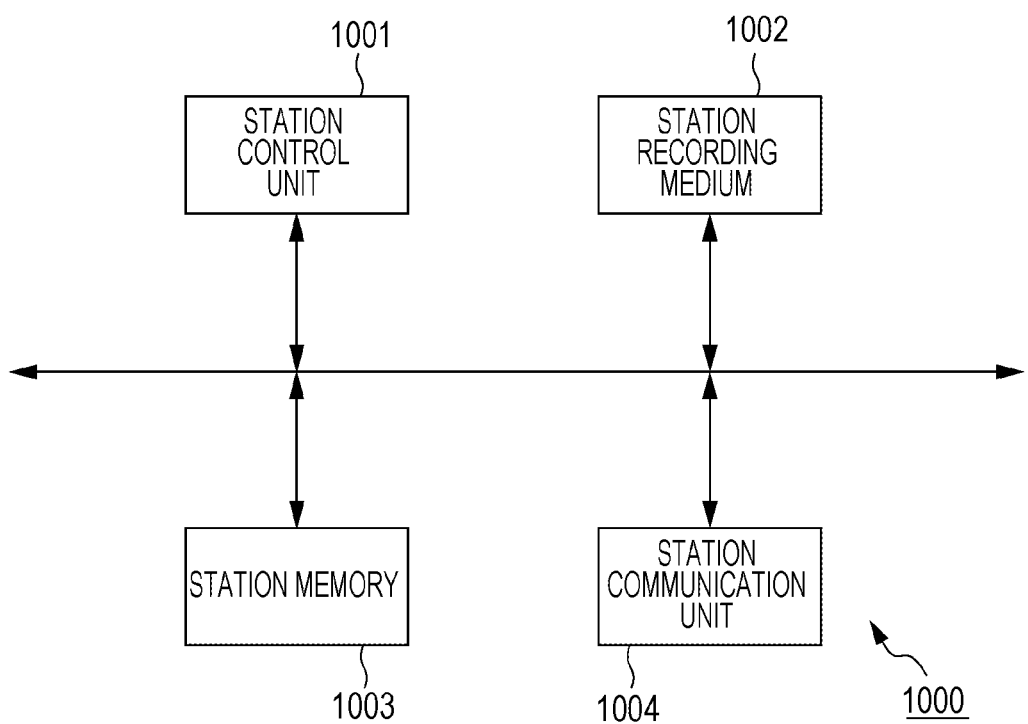
FIG. 10 is a block diagram illustrating a functional configuration of a distribution station according to a second embodiment of the present invention.

Hereinafter, a functional configuration of a distribution station 1000, which is a second communication terminal according to the present invention, configured so as to be capable of communicating with the game device 100 in the game system of this embodiment will be described with reference to the block diagram in FIG. 10. Note that, in the following description, a constituent element of the distribution station 1000 that implements a function similar to that in the game device 100, the smartphone 200, and the management server 400 is given a name including the prefix "station" so as to be distinguishable.

A station control unit 1001 is, for example, a CPU and controls operations of the blocks of the distribution station 1000. Specifically, the station control unit 1001 reads an operation program, for the blocks, recorded to, for example, a station recording medium 1002, loads the operation program to a station memory 1003, and executes the operation program to thereby control operations of the blocks.

The station recording medium 1002 is, for example, a recording device, such as a nonvolatile memory or an HDD, capable of retaining data in a substantially permanent manner. To the station recording medium 1002, parameters, etc. necessary for operations of the blocks and other information are recorded in addition to the operation program for the blocks of the distribution station 1000. The station memory 1003 is, for example, a recording device, such as a volatile memory, used to temporarily store data. The station memory 1003 is used not only as a loading area for the operation program for the blocks but also as a storage area for temporarily storing data, etc. output in the operations of the blocks.

A station communication unit 1004 is a communication interface of the distribution station 1000 for transmitting and receiving information. In this embodiment, the distribution station 1000 is configured so as to be capable of communicating with one or more game devices 100 in which the application program concerning the raising game is executed, without the network 300. Further, as the communication method for transmitting and receiving information, only one type of communication method the same as that of the second communication unit 108 of the game device 100 may be provided as a usable communication method.

Communication Element Between Game Device and Distribution Station

In the first embodiment described above, it is assumed that an item is given to the target character through communication between the game devices or in accordance with the specifics of the play in the interaction game, and the description has been given; however, an item to be given may be configured so as to be obtainable from a device that is not configured to be capable of providing a play experience of the games. For example, in order to extend amusing elements that are provided to the user who carries the game device 100 and goes out, the raising game may be configured so that, in a case where the game device 100 enters a communication possible range of the distribution station 1000 that is installed at a location, a game element that is related to the location can be obtained when the game device 100 communicates with the distribution station 1000.

As described above, in this embodiment, in order to avoid a situation where the user needs to perform an operation concerning communication, communication between the game device 100 and the distribution station 1000 is performed by employing the BLE method to transmit and receive information between the game device 100 and the distribution station 1000. In this form, the distribution station 1000 functions as a broadcaster that transmits data via the station communication unit 1004 in a unidirectional manner, and the game device 100 functions as an observer that receives the data thus transmitted via the second communication unit 108.

Figure 11:
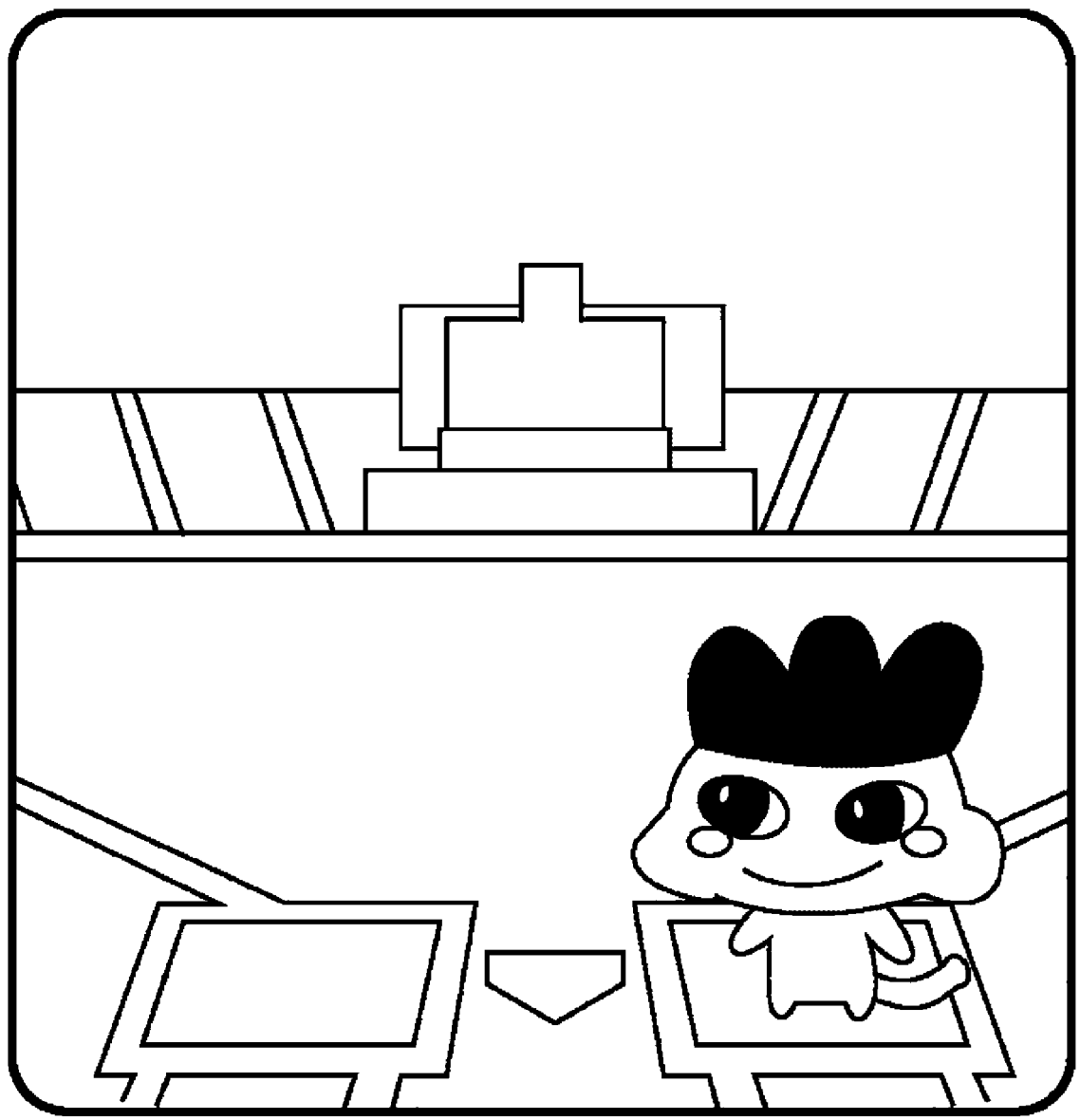
FIG. 11 is a diagram illustrating a display form of the target character when information is received from the distribution station according to the second embodiment of the present invention.

Data related to the location and provided from the distribution station 1000 to the game device 100 may be, for example, a back ground image, etc. that is configured so as to match a scene of the location where the distribution station 1000 is installed. In a case where the background image is received, the presentation control unit 105 performs control to display, on the display unit 110, for example, an image obtained by superimposing the target character on the background image, as illustrated in FIG. 11. Accordingly, when the user carries the game device 100, further amusing elements can be provided. As a result, the user's interest in the raising game can be further increased. Here, the background image may be handled as one form of the second-type game element according to the present invention.

Note that, in a state where the game device 100 is caused to function as an observer so as to be able to obtain information in a case where the game device 100 enters the communication possible range of the distribution station 1000, the second communication unit 108 is controlled to be kept in a communication standby state. That is, unlike the form in which the user needs to intentionally start communication between the game devices 100 and between the game device 100 and the smartphone 200, when control is performed so that the second communication unit 108 is continuously kept in a communication standby state, the battery of the game device 100 is drained fast. Therefore, the function of receiving information from the distribution station 1000 may be configured so as to allow switching between execution and non-execution in accordance with user setting.

Other Embodiments

The present invention is not limited to the above-described embodiments, and various changes and modifications can be made without departing from the spirit and scope of the present invention. Further, the game device according to the present invention can be implemented as a program that causes one or more computers to function as the game device. This program can be recorded to a computer-readable recording medium and provided or distributed, or can be provided or distributed via a telecommunication line.

That which is claimed:

1. A game device for providing a play experience of a first game in which a first game element appears, the game device comprising:
   a processor to perform a process concerning the first game;
   operation receiver to accept an input operation for an operation target game element comprising the first game element appearing in the first game;
   a transmitter configured for transmitting and receiving information concerning the operation target game element between the game device and a second game device and between the game device and a first communication terminal capable of providing a play experience of a second game using the first game element; and
   a control circuit to control the transmitter.

2. The game device according to claim 1, wherein
   the first communication terminal is configured to communicate with a second communication terminal configured for providing the play experience of the second game, and
   the first communication terminal and the second communication terminal are configured so as to be able to remotely communicate with each other over a network communication path that is longer than a first communication path over which the game device and the second game device are able to communicate with each other or longer than a second communication path over which the game device and the first communication terminal are able to communicate with each other.

3. The game device according to claim 1, further comprising
   a first display to display the first game element concerning the first game, wherein
   the first communication terminal comprises a second display to display the first game element concerning the second game, and
   the second display is configured for displaying a larger number of first game elements than the number of first game elements displayed by the first display.

4. The game device according to claim 3,
   wherein the first display comprises a performance indicator indicating that the operation target game element is caused to appear in the second game in a case where information concerning the operation target game element is transmitted to the first communication terminal by the transmitter, wherein
   wherein the first display is configured to display the performance indicator indicating that the operation target game element is caused to appear in the second game on condition that the first communication terminal is present within a communication possible range of the game device.

5. The game device according to claim 4, wherein
   if the performance indicator indicates that the operation target game element is caused to appear in the second game, the first display displays an image indicating that the operation target game element is in a game executed in another device instead of displaying the operation target game element.

6. The game device according to claim 5, wherein
if the performance indicator indicates that the operation target game element is caused to appear in the second game, the first display displays the operation target game element instead of the image indicating that the operation target game element is in a game executed in the another device on condition that a request for ending the second game is received from the first communication terminal.

7. The game device according to claim 4, wherein
the first display displays a second first game element on condition that the performance indicator indicates that the operation target game element is caused to appear in the second game, and thereafter, the operation target game element has a predetermined relationship with another first game element in the second game.

8. The game device according to claim 7, wherein
in a case where the performance indicator indicates that the operation target game element is caused to appear in the second game, the first display displays the second first game element together with the operation target game element on condition that a request for ending the second game is received from the first communication terminal.

9. The game device according to claim 7, wherein
the first game elements are configured so as to be in a form that changes in accordance with progress made in the first game,
the form of the first game elements comprises at least a first form and a second form different from the first form, and
the second first game element is displayed on the first display in the first form.

10. The game device according to claim 7, wherein
the second first game element is configured so as to be allowed to be set as a new operation target game element in place of the operation target game element, and
the operation target game element is associated with generation information comprising a numerical value that is incremented each time the operation target game element is newly set.

11. The game device according to claim 10, wherein
the first display displays a plurality of second first game elements on condition that the numerical value included in the generation information associated with the operation target game element is equal to or larger than a threshold.

12. The game device according to claim 3, wherein
the operation target game element is associated with status information that changes in accordance with progress made in the first game, and
the first display
displays the operation target game element in a center part of a display area on condition that the status information corresponds to a first rank, and
displays the operation target game element in a peripheral part of the display area on condition that the status information corresponds to a second rank different from the first rank.

13. The game device according to claim 3, wherein
the game device and the second game device transmit and receive information to and from each other using a first communication method, and the game device and the first communication terminal transmit and receive information to and from each other using a second communication method different from the first communication method.

14. The game device according to claim 13, wherein
the transmitter is configured for transmitting and receiving information concerning the first game to and from a second communication terminal different from the first communication terminal by using the second communication method.

15. The game device according to claim 14, wherein
the transmitter is configured for obtaining, through communication, a second game element different from the first game elements from at least one of the second game device, the first communication terminal, and the second communication terminal.

16. The game device according to claim 15, wherein
the control circuit obtains the second game element from the second communication terminal on condition that the game device is present within a range in which the game device is able to communicate with the second communication terminal.

17. The game device according to claim 16, wherein
the second game element is a background image that is displayed on the first display together with the operation target game element.

18. The game device according to claim 14, wherein
setting as to whether to communicate with the second communication terminal is possible, and
the control circuit controls the transmitter so as to allow communication with the second communication terminal on condition that communication with the second communication terminal is set.

19. The game device according to claim 1, wherein
the control circuit is further configured to determine a state of the operation target game element in the first game, wherein
the control circuit controls the transmitter so as to be in a communication possible state on condition that the state of the operation target game element is a first state.

20. The game device according to claim 19, wherein
the control circuit controls the transmitter so as to be in a communication non-possible state in a case where the state of the operation target game element is a second state different from the first state.

21. The game device according to claim 20, wherein the control circuit is further configured to
set a time of a built-in clock, wherein
determine the state of the operation target game element in accordance with a current time indicated by the built-in clock.

22. The game device according to claim 21, wherein
the control circuit is further configured to
determine that the operation target game element is in the first state on condition that the current time indicated by the built-in clock is within a first time period, and
determine that the operation target game element is in the second state on condition that the current time indicated by the built-in clock is within a second time period different from the first time period.

23. The game device according to claim 20, wherein
the first state is a state in which action control, of the operation target game element, corresponding to an input operation accepted by the operation receiver is performed, and the second state is a state in which action control, of the operation target game element, corresponding to an input operation accepted by the operation receiver is not performed.

24. The game device according to claim 20, further comprising:
a notifier to make a notification in a case where an event that requires an input operation for the operation target game element occurs while the first game progresses; and
a changer to change, in a case where the notification is made by the notifier, the state of the operation target game element in accordance with whether an input operation for the notification is performed, wherein
in a case where the notification is made by the notifier, the changer changes the state of the operation target game element to the second state on condition that an input operation for the notification is not performed.

25. A program causing a computer to function as the game device according to claim 1.

26. A game system comprising:
a game device for providing a play experience of a first game in which a game element appears; and
a communication terminal for providing a play experience of a second game using the game element,
the game device comprises
first performing means for performing a process concerning the first game,
first operation means for accepting an input operation for an operation target game element that is the game element appearing in the first game,
first communication means configured for transmitting and receiving information concerning the operation target game element between the game device and a second game device and between the game device and the communication terminal, and
control means for controlling the first communication means,
the communication terminal comprising
second communication means configured for transmitting and receiving information concerning the operation target game element to and from the game device,
second performing means for performing a process concerning the second game based on information concerning the operation target game element received by the second communication means, and
second operation means for accepting an input operation for the operation target game element concerning the second game.

27. The game system according to claim 26, wherein
the game device further comprises first display means for displaying, with a first resolution, the game element in a game scene concerning the first game,
the communication terminal further comprises second display means for displaying, with a second resolution higher than the first resolution, the game element in a game scene concerning the second game, and
the operation target game element is controlled in such a manner that, in a case where the operation target game element is displayed on one of the first display means and the second display means, the operation target game element is not displayed on the other of the first display means and the second display means.

* * * * *